(12) United States Patent
Lewis

(10) Patent No.: US 12,361,816 B2
(45) Date of Patent: Jul. 15, 2025

(54) REMOTELY MONITORING USERS AND GENERATING EMERGENCY EVENT CODE TEMPORARILY ALLOWING EMERGENCY DISPATCHER TO ACCESS COLLECTED DATA FOR USER EXPERIENCING EMERGENCY

(71) Applicant: eForce Recovery System Inc., Calgary (CA)

(72) Inventor: Brennan Douglas Lewis, Calgary (CA)

(73) Assignee: eForce Recovery System Inc., Calgary (CA)

( * ) Notice: Subject to any disclaimer, the term of this patent is extended or adjusted under 35 U.S.C. 154(b) by 391 days.

(21) Appl. No.: 18/157,234

(22) Filed: Jan. 20, 2023

(65) Prior Publication Data

US 2023/0245552 A1 Aug. 3, 2023

(30) Foreign Application Priority Data

Feb. 3, 2022 (CA) .................................. CA 3147550

(51) Int. Cl.
| | |
|---|---|
| *H04W 4/00* | (2018.01) |
| *G08B 25/00* | (2006.01) |
| *G08B 25/01* | (2006.01) |
| *H04W 76/50* | (2018.01) |

(52) U.S. Cl.
CPC ......... *G08B 25/016* (2013.01); *G08B 25/005* (2013.01); *H04W 76/50* (2018.02)

(58) Field of Classification Search
CPC ...... H04W 4/90; H04W 76/50; G08B 25/016; G08B 25/005
See application file for complete search history.

(56) References Cited

U.S. PATENT DOCUMENTS

| | | | |
|---|---|---|---|
| 9,492,120 B2 | 11/2016 | Horseman | |
| 10,108,783 B2 * | 10/2018 | Horseman | ............ A61B 5/0002 |
| 10,824,132 B2 | 11/2020 | Horseman et al. | |
| 2011/0071880 A1 * | 3/2011 | Spector | ................ H04W 76/50 340/539.13 |
| 2012/0010488 A1 | 1/2012 | Henry et al. | |
| 2020/0273313 A1 | 8/2020 | Stinson et al. | |
| 2021/0134455 A1 | 5/2021 | Smith | |
| 2021/0228089 A1 | 7/2021 | Williams | |

\* cited by examiner

*Primary Examiner* — Omoniyi Obayanju
(74) *Attorney, Agent, or Firm* — ATMAC Patent Services Ltd.; Andrew T. MacMillan

(57) ABSTRACT

A system for remote user monitoring includes a user monitoring device and a controller. The controller receives sensor data from the user monitoring device and updates stored user data accordingly. Upon confirmation of an emergency associated with a particular user, the controller generates an emergency event code, associates the code with the particular user, and sends the code to a monitoring operator to provide to emergency dispatch. When receiving a user data access request including the emergency event code from an emergency dispatcher, the controller only provides user data associated with the particular user when determining that the emergency event code received from the emergency dispatcher is active. The user monitoring device may store an on-shift configuration specifying which information to send to the controller during an on-shift mode and an off-shift configuration specifying which information to send during an off-shift mode, and may dynamically change modes at different times.

20 Claims, 22 Drawing Sheets

1000

User data privacy configuration:

Your employer can view your information as follows:

|  | On-shift (unlock) 1008 | Off-shift | Emergency (unlock) 1010 |
|---|---|---|---|
| Location | ✓ | ○ | ✓ |
| Biometrics | ✓ | ○ | ✓ |
| SOS | ✓ | ● | ✓ |
| Check In | ✓ | ○ | ✓ |
| Battery – 25% | ✓ | ● | ✓ |
| Send interval | 45 min | 60 min | 5 min |

1004 — On-shift; 1002 — Off-shift; 1006 — Emergency

[Save changes] [Cancel]

User data privacy configuration:

Your employer can view your information as follows:

|  | Visible 1004'<br>(unlock) 1008 | Invisible 1002' | Emergency 1006<br>(unlock) 1010 |
|---|---|---|---|
| Location | ✓ | ⊘ | ✓ |
| Biometrics | ✓ | ⊘ | ✓ |
| SOS | ✓ | ● | ✓ |
| Check In | ✓ | ⊘ | ✓ |
| Battery – 25% | ✓ | ● | ✓ |
| Send Interval | 45 min | 60 min | 5 min |
| Mode Toggle | | ● 1012 | |

[Save changes] [Cancel]

FIG. 10A

REMOTELY MONITORING USERS AND GENERATING EMERGENCY EVENT CODE TEMPORARILY ALLOWING EMERGENCY DISPATCHER TO ACCESS COLLECTED DATA FOR USER EXPERIENCING EMERGENCY

CROSS-REFERENCE TO RELATED APPLICATIONS

This application claims the benefit of priority of Canadian Patent Application No. 3,147,550 filed Feb. 3, 2022, which is incorporated herein by reference.

BACKGROUND OF THE INVENTION

(1) Field of the Invention

The invention pertains generally to remotely monitoring users such as lone workers and then assisting emergency dispatchers to quickly dispatch and effectively coordinate emergency services during emergency events. More specifically, the invention relates to devices, systems and methods for remotely monitoring users and generating an emergency event code that is provided to the emergency dispatcher for temporarily allowing an emergency dispatcher to access collected data about a particular user experiencing an emergency.

(2) Description of the Related Art

Remote user monitoring is a common safety requirement for certain jobs and situations such as lone workers in hazardous environments. A worker needing to be monitored for safety wears or carries one or more electronic devices that monitor certain aspects of either the user and/or the user's environment and report corresponding data back to a monitoring facility staffed by the user's company. Typically, the user wears or carries an electronic sensor device that is paired with the user's mobile phone, and the electronic sensor device transfers sensor data back to the company's monitoring facility via the user's mobile phone acting as an intermediary.

Employees at the company's monitoring facility keep track of one or more remote workers according to sensor and other data received from the various users. In the event that personnel at the central monitoring facility determine that a particular remote user is experiencing an emergency, the company monitoring facility personnel contact an emergency dispatch such as the local 911 public-safety answering point (PSAP). Details about the active emergency event such as the name of the individual involved, their medical situation and their location are then verbally conveyed to the emergency dispatcher over the phone.

There are various problems with the typical remote user monitoring described above. For one, the process of informing the emergency dispatcher details about the emergency event over the phone is time consuming and error prone. A monitoring facility employee needs to call the appropriate emergency dispatcher on the phone and then verbally transfer all required information such as the location, situation, person involved, background information, updates to the situation over time, call back contact information, etc.

In some situations, an incorrect emergency dispatcher may be initially called such as in the event that the local 911 centre near the company's monitoring facility does not handle emergencies in the geographic region of the user experiencing the emergency. When an incorrect emergency dispatch is called, a transfer will be necessitated slowing the overall response time.

In an emergency situation when seconds count, the verbal exchange of all information about the emergency is also not ideal. In many situations, it would be beneficial for the company employee to be able to electronically send information to the emergency dispatcher. This can currently be done using email; however, emergency dispatchers are not always set up to receive emails from callers and the callers likely will not know what email address to use. Even if email addresses are exchanged or known, compiling the appropriate information into one or more emails by the monitoring facility employees and then sending to the emergency dispatcher is awkward and itself a slow and error prone process.

Furthermore, an important and widely held concern in the modern technical age, the significance of which is growing over time as the public hears more and more about data breaches, is the sensitivity and safekeeping of one's personal data, and so a noteworthy shortcoming in the prior art is a failure to specifically address ways to manage personal data privacy and security in the context of worker safety monitoring.

BRIEF SUMMARY OF THE INVENTION

According to an exemplary embodiment of the invention there is disclosed a system for remote user monitoring. The system includes a user monitoring device having one or more sensors and being associated with a user, and a controller at least intermittently coupled to the user monitoring device by one or more networks. The controller includes one or more storage devices and one or more processors, and, by executing software loaded from the one or more storage devices, the one or more processors are configured to receive a plurality of sensor data from the user monitoring device. The one or more processors are further configured to update a plurality of user data associated with the user in the one or more storage devices according to the sensor data, detect a potential emergency associated with the user at least according to the sensor data and send an alert for notifying a monitoring operator of the potential emergency associated with the user. In response to receiving a message from the monitoring operator confirming the user is experiencing an emergency event, the one or more processors are further configured to generate an emergency event code and store in the one or more storage devices i) an association of the emergency event code with the user and ii) an indication that the emergency event code is active. The one or more processors are further configured to send the emergency event code to the monitoring operator and receive a user data access request from an emergency dispatcher, the user data access request including the emergency event code. The one or more processors are further configured to look up in the one or more storage devices whether the emergency event code received from the emergency dispatcher is active, reply to the user data access request with one or more parts of the user data associated with the user when determining that the emergency event code received from the emergency dispatcher is active, and reply to the user data access request with an access denied message when determining that the emergency event code received from the emergency dispatcher is not active.

According to an exemplary embodiment of the invention there is disclosed a system for remote user monitoring. The system includes one or more user devices associated with a user, and a controller that is at least intermittently couplable to the one or more user devices by one or more computer networks. The one or more user devices includes at least a user monitoring device having one or more sensors. The one or more user devices possess among them one or more storage devices and one or more processors, and, by executing software loaded from the one or more storage devices of the one or more user devices, the one or more processors of the one or more user devices are configured to store a first mode configuration specifying which information to send to the controller during a first mode and store a second mode configuration specifying which information to send to the controller during a second mode. The one or more processors are further configured to dynamically change a mode setting between one of at least the first mode and the second mode, and, at each of a plurality of different times, send the sensor data to the controller, and include in the sensor data one or more sensor data types selected according to the mode setting at a time that the sensor data is sent to the controller.

According to another exemplary embodiment of the invention there is disclosed a system for remote user monitoring. The system includes one or more user devices associated with a monitored user, and a controller that is at least intermittently couplable to the one or more user devices, and also to one or more status monitoring devices associated with one or more monitoring operators, by one or more computer networks. The one or more user devices includes at least a user monitoring device having one or more sensors. The one or more user devices and the controller possess among them one or more storage devices and one or more processors, and, by executing software loaded from the one or more storage devices, the one or more processors are configured to at least intermittently collect sensor data from the one or more sensors at the controller, store a first mode configuration specifying which information to make visibly accessible to the monitoring operators during a first mode and store a second mode configuration specifying which information to make visibly accessible to the monitoring operators during a second mode. The one or more processors are further configured to change a mode setting between one of at least the first mode and the second mode, and, in accordance with the change of the mode setting, make a change in a visible accessibility of at least one sensor data type to the one or more monitoring operators on the one or more status monitoring devices according to the change of the mode setting.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof:

FIG. 10 illustrates a user data privacy configuration screen that may be displayed on a user's mobile phone acting as a configuration device according to an exemplary embodiment.

FIG. 10A illustrates a variant of the user data privacy configuration screen of FIG. 10.

DETAILED DESCRIPTION

Figure 1:
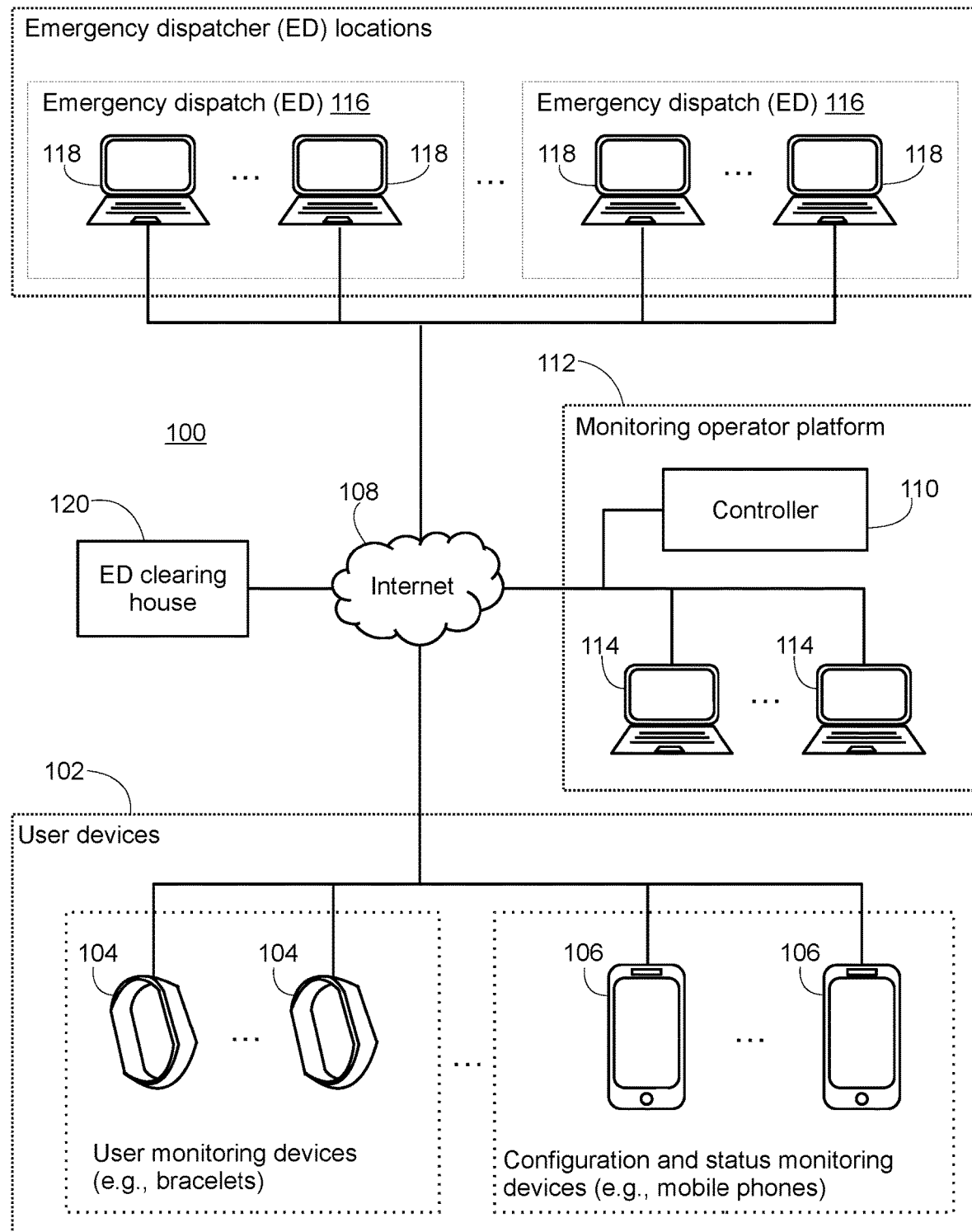
FIG. 1 shows a system for remote user monitoring according to an exemplary embodiment.

FIG. 1 shows a system 100 for remote user monitoring according to an exemplary embodiment. The system 100 includes a plurality of user devices 102 which may be worn and/or carried by remote users. The user devices 102 include monitoring devices 104 such as bracelets worn by each of the users to be monitored. The user devices 102 may further include one or more configuration and status monitoring devices 106 such as mobile phones. In some embodiments, the configuration and status monitoring devices 106 are not required to be carried by the users being monitored; however, as will be explained in more detail below, they may at times be utilized by the users being monitored and may also be utilized by other users such as team leads and/or family that may or may not themselves be remotely monitored.

The various user devices 102 are coupled via one or more networks 108 such as the Internet to a controller 110 of a monitoring operator platform 112. For instance, the monitoring operator platform 112 may be run by a company for monitoring lone worker users, and the controller 110 may be a computer server at the corporate office of the company. Monitoring operators access the controller 110 via one or more monitoring operator terminals 114. In some embodiments, the controller 110 and monitoring operator terminals 114 are computers located onsite at the corporate office. In other embodiments, these device 110, 114 may be physically separated and accessed via the Internet and/or other network 108 from anywhere in the world.

The system 100 further includes one or more emergency dispatcher (ED) locations 116, which may include regional public-safety answering points (PSAPs) at different geographic locations (cities, regions, etc.). Each emergency dispatch (ED) location 116 includes one or more emergency dispatch operator terminals 118, and similar to the monitoring operator terminals 114 may be located together in a single emergency dispatch (ED) office 116 or may be located at other sites and coupled to the ED office 116 via the Internet or other computer network 108.

An emergency dispatch (ED) clearing house 120 is further coupled to the Internet 108 in some embodiments. The ED clearing house 120 includes one or more computer servers providing an application programming interface (API) for facilitating access to different emergency dispatcher (ED) locations 116.

Figure 2:
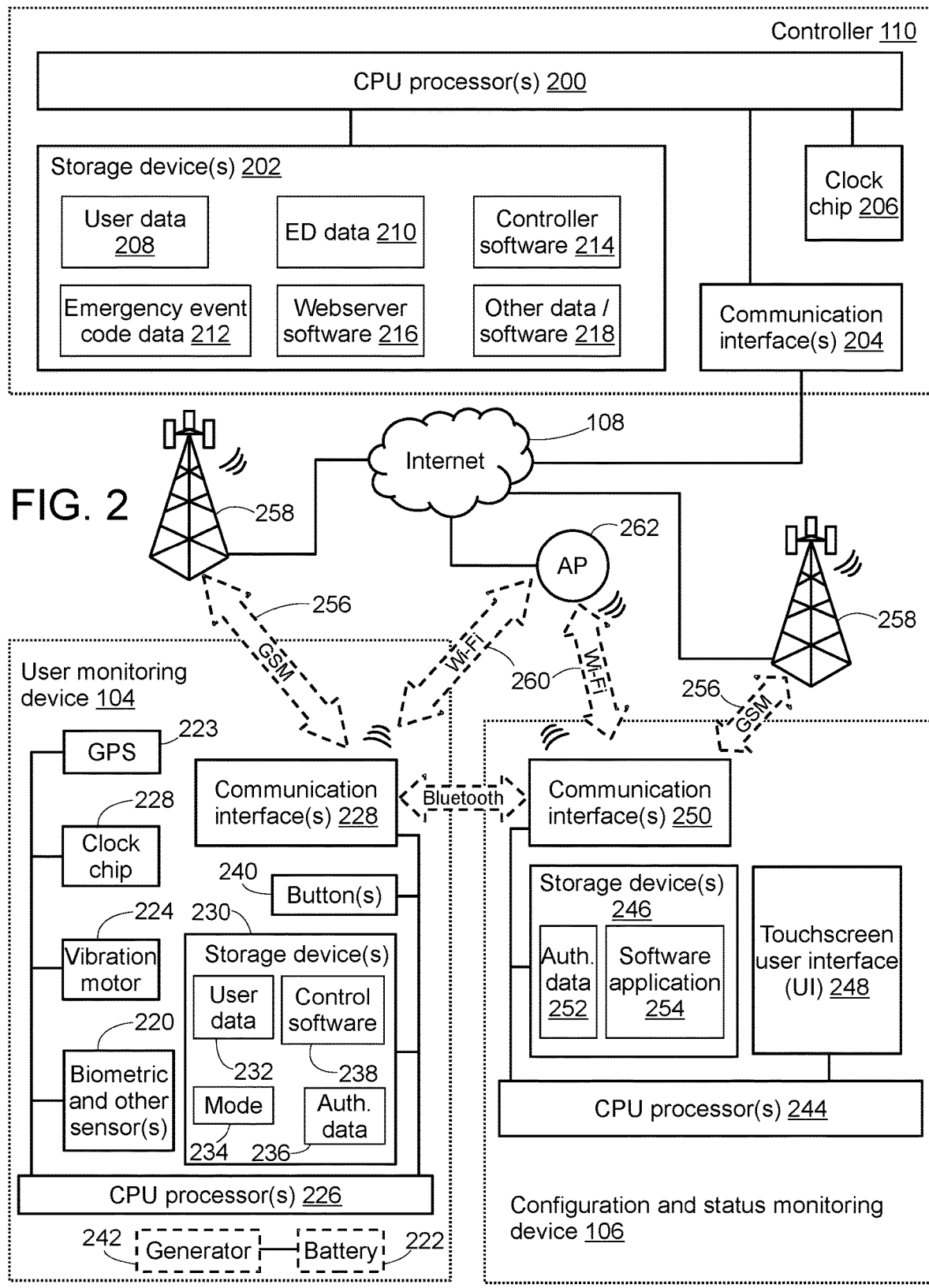
FIG. 2 illustrates a block diagram showing various components forming and coupling together the controller along with a user monitoring device and a configuration and status monitoring device of FIG. 1 according to an exemplary embodiment.

FIG. 2 illustrates a block diagram showing various components forming and coupling together the controller 110 along with a user monitoring device 104 and a configuration and status monitoring device 106 of FIG. 1 according to an exemplary embodiment.

The controller 110 is implemented in this embodiment as a computer server including one or more processors 200. The one or more processors 200 may be included in a central processor unit (CPU) of a computer server acting as the controller 110. In the following description the plural form of the word "processors" will be utilized as it is common for a CPU of a computer server to have multiple processors 200 (sometimes also referred to as cores); however, it is to be understood that a single processor 200 may also be configured to perform the described functionality in other implementations.

Coupled to the processors 200 are one or more storage devices 202, one or more communication interfaces 204 and a clock chip 206. The storage devices 202 may include any desired memories such as random access memory (RAM), FLASH memory, and/or magnetic storage devices such as hard drives to name some examples. The storage devices 202 store therein a plurality of data and software including, for example, user data 208, emergency dispatch (ED) data 210, emergency event code data 212, controller software 214, and webserver software 216. Other data and software 218 may be included as desired.

The communication interfaces 204 may include an Ethernet transceiver for coupling the controller to the Internet 108 via a wired Ethernet network. Other types of communication interfaces 204 may be utilized as desired such as Wi-Fi transceivers for wireless access. The clock chip 206 may be a real time clock (RTC) used for tracking time and allowing the processors 200 to schedule events based on time of day and elapsed time durations. Other components may be included in the controller 110 as desired.

The user monitoring device in this embodiment is a wearable device taking the form of a bracelet. The bracelet is an embedded computing device including one or more processors, which, similar to the controller, may be included in a CPU of the bracelet. Again, the plural form of the word "processors" will be utilized as it is common for a CPU of an embedded device to have multiple processors (sometimes also referred to as cores); however, it is to be understood that a single processor may also be configured to perform the described functionality in other implementations.

The user monitoring device 104 further includes a plurality of biometric and other sensors 220. Examples of biometric sensors may include heartbeat sensor, temperature sensor, moisture sensor, sound sensor (i.e., microphone), light sensor, etc. Other sensors may also be included such as an accelerometer to detect movement/seizures and a voltage sensor or other battery level sensor to monitor a charge level of the battery 222. A global positioning system (GPS) sensor 223 may also be included to receive satellite-based signals in order to determine position, velocity, and timing information associated with the user wearing the bracelet 104. A vibration motor 224 allows one or more processors 226 to provide haptic feedback to the user and a clock chip 228 such as a real time clock (RTC) is included for allowing the processors 226 to track time and schedule events based on time of day and elapsed time durations. The processors 226 may be included in a CPU of a bracelet or other device acting as the user monitoring device 104 and the plural form of the word "processors" will be utilized as it is common for a CPU of an embedded device to have multiple processors 226 (sometimes also referred to as cores); however, it is to be understood that a single processor 226 may also be configured to perform the described functionality in other implementations.

The user monitoring device 104 further includes one or more communications interfaces 228. In some embodiments, a plurality of wireless communications interfaces 228 are provided including Wi-Fi transceiver for providing wireless local area access (LAN) access, a global system for mobile communications (GSM) transceiver chip for providing wide area network (WAN) access via one or more telecommunications networks, and a Bluetooth transceiver chip for providing personal area network (PAN) access. Fewer or additional (or different) types of communications interfaces 228 may be provided in other embodiments.

The user monitoring device 104 in this embodiment further includes one or more storage devices 230 such as RAM and FLASH memory to store various software and data including, for example, user data 232, mode setting and configuration data 234, authentication data 236, and control software 238. One or more buttons 240 are further included to allow the user to provide manual input to the processors 226. A battery 222 provides electrical power to the user monitoring device 104 and a generator 242 such as a piezoelectric nanogenerator may be included to harvest energy for charging the battery 222 by converting kinetic motion of the user monitoring device 104 into electrical energy. Other components may be included as desired.

The configuration and status monitoring device 106 is implemented in this embodiment by a mobile phone including one or more processors 244, one or more storage devices 246, touchscreen user interface (UI) 248 and one or more communications interfaces 250. Similar to as described above for the controller 110 and user monitoring device 104, the processors 244 may be included in a CPU of the mobile phone and the plural form of the word "processors" will be utilized as it is common for a CPU of a mobile phone to have multiple processors 244 (sometimes also referred to as cores); however, it is to be understood that a single processor 244 may also be configured to perform the described functionality in other implementations. The storage device 246 in this embodiment may be implemented by a combination of RAM and FLASH memory and store various data and software. Examples include authentication data 252 and a custom software application 254 for execution by the mobile phone processors 244.

In some embodiments, the software application 254 running on the mobile phone acting as the configuration and status monitoring device 106 provides the ability to access one or more user monitoring devices 104 for configuring said user monitoring devices 104. Likewise, the software application 254 may further provide the ability to monitor the status of different user monitoring devices 104 and/or users by receiving alerts and other messages from the controller 110.

As shown in FIG. 2, the user monitoring device 104 may be intermittently coupled to the controller 110 via a GSM network 256 by communicating with one or more cell phone towers 258. At other times, the user monitoring device 104 may be coupled to the controller 110 via a Wi-Fi network 260 by communicating with an access point (AP) 262. Similar communication methods may also be used between the configuration and status monitoring device 106 and the controller 110. It may also be the case that these user devices 104, 106 (i.e., bracelets, mobile phones) may at times not be coupled to the controller 110 such as when they are not within range of either a cell phone tower 258 or AP 262. Likewise, in some embodiments, fewer communication interfaces 228, 250 may be provided—for example, the user monitoring device 104 may include a GSM communications interface but not a Wi-Fi communications interface and thus the user monitoring device 104 will only be coupled to the controller 110 when in range of a subscribed GSM network 256. In some embodiments, when not coupled to the controller 110, user data 232 such as sensor data and button data is stored within the storage device 230 of the user monitoring device 104 for later transmission to the controller 110 when a connection becomes available.

Figure 3:
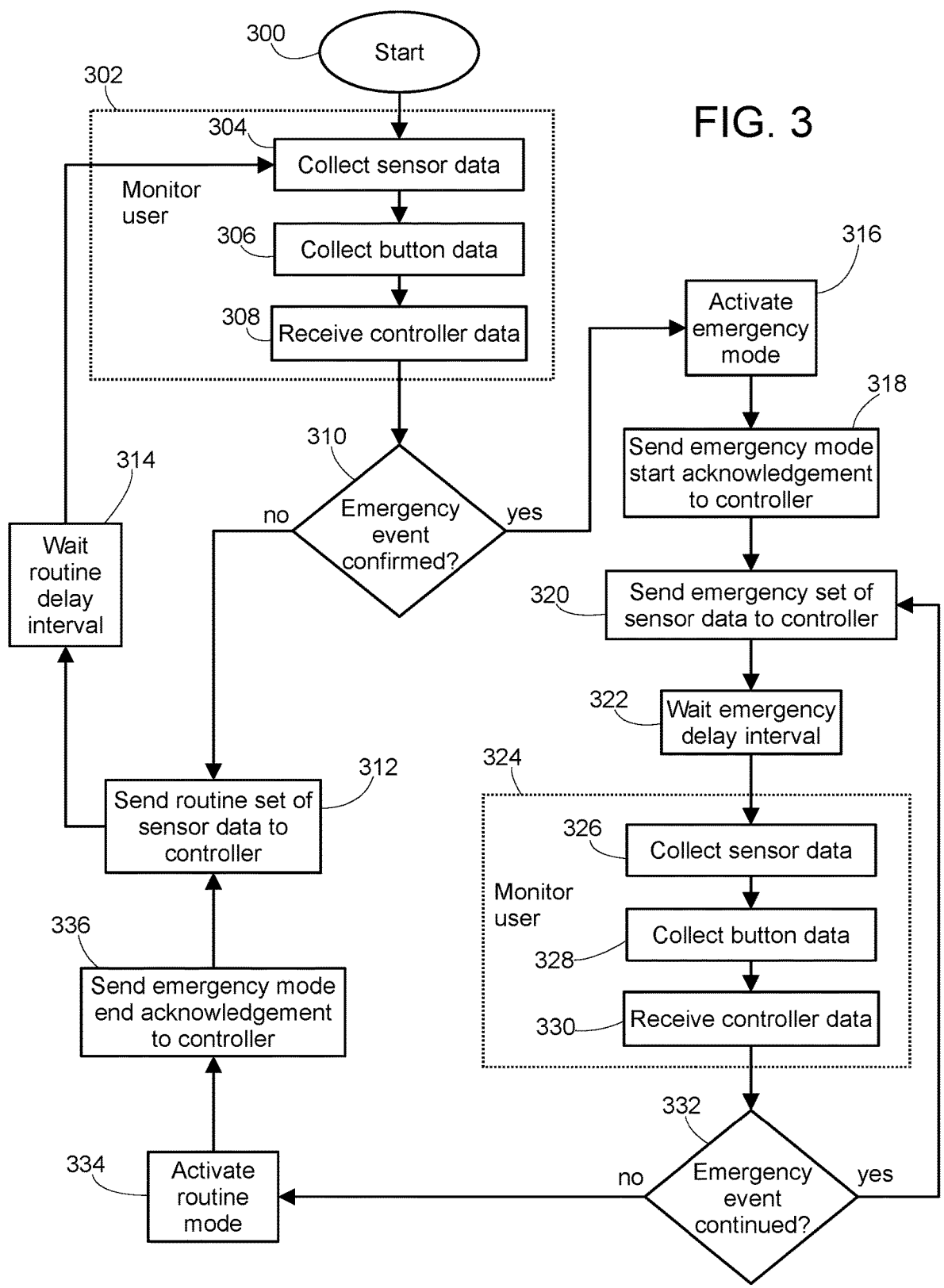
FIG. 3 shows a flowchart of a method of monitoring a user as performed by the user monitoring device of FIG. 2 according to an exemplary embodiment.

FIG. 3 shows a flowchart of a method of monitoring a user as performed by the user monitoring device 104 of FIG. 2 according to an exemplary embodiment. The steps of FIG. 3 may be performed by processors 226 of the user monitoring device 104 executing the control software 238 loaded from the storage devices 230. The steps of the flowchart are not restricted to the exact order shown, and, in other configurations, shown steps may be omitted or other intermediate steps added.

The process begins at step 300, which in some embodiments corresponds to power up of the user monitoring device 104. This may occur from the moment the battery 222 begins powering the user monitoring device 104 and in some embodiments there may be no off switch, thereby ensuring that the user monitoring device 104 is always active and running as long as it has power. By default, the user monitoring device 104 may be in a routine mode upon startup and an indication of this mode may be stored in the mode data 234 of the storage devices 230.

At step 302, the processors 226 monitor the user. This step is broken into three sub-steps starting with step 304 involving the processors 226 collecting sensor data such as heart rate, GPS location information, accelerometer information, etc. At step 306, the processors 226 similarly collect button data from the button 240, which may involve checking the button 240 to see if it has had a state change (e.g., a press or a release). At step 308, the processors 226 check the communications interface 228 to see if one or more messages have been received from controller 110. Collected data received by the processors 226 from the various sensors 220, GPS 223, and/or communications interface 228 is temporarily stored as user data 232 in the storage devices 230 and is timestamped according to the time information received from the clock chip 228.

Although the above steps 304, 306, 308 have been described above as being performed by the processors 226 polling the various devices such as GPS 223, sensors 220, buttons 240, and communications interfaces 228, in some embodiments, these steps are interrupt-based such that as soon as data is available, the processors 226 will receive an interrupt or message and actively update the timestamped user data 232 stored in the storage device 230 accordingly.

At step 310, the processors 226 determine whether an emergency event has been confirmed. In some embodiments, a human monitoring operator at the monitoring platform 112 manually confirms whether or not an emergency event is occurring and thus the processors 226 of the user monitoring device 104 at step 310 check the stored user data 232 to see whether an emergency mode confirmation message has been received from the controller 110 at step 308. When yes, control proceeds to step 316; alternatively, when the controller 110 has not sent a message confirming that an emergency event is occurring, control proceeds to step 312.

In some embodiments, the processors 226 of the user monitoring device 104 may also automatically confirm certain emergency events such as by monitoring the sensor data received from sensors 220 and/or location data received from the GPS 223 and/or button data received from the buttons 240. For instance, in the event that a save-our-soles (SOS) button 240 is pressed by the user wearing the user monitoring device 104, the processors 226 may automatically confirm that an emergency event is taking place and proceed automatically to step 316 without awaiting controller 110 confirmation of the emergency event.

At step 312, the processors 226 send a routine set of sensor data to the controller 110 via the communications interface(s) 228. For example, assuming a GSM connection 256 is available, the processors 226 may send collected sensor data back to the controller 110 utilizing the GSM connection 256. Other connection types may also be available and utilized at this step such as via Wi-Fi 260.

The routine set of sensor data includes certain information collected by the user monitoring device 104. As will be explained further below, in some embodiments, the routine set of sensor data is dynamically changed by the processors 226 between an on-shift configuration and an off-shift configuration. For instance, while the worker wearing the user monitoring device 104 is on-shift (i.e., working for the company), the routine set of sensor data may be configured by the processors 226 to include all collected sensor 220, button 240, and GPS 223 data. However, while the worker is off-shift (i.e., not working for the company), the routine set of sensor data may only include certain limited aspects of the buttons 240 such as whether an SOS button has been pressed along with certain limited aspects of the sensors 220 such as the battery 222 level of the user monitoring device 104. The configurations are stored in the monitoring device storage device 230 and utilized by the processors 226 to select which routine sensor data to send to the controller 110 based on whether the device 104 is in the on-shift mode or off-shift mode.

If no connection to the controller 110 is available at step 312, the processors 226 may cache the routine sensor data to send at a later time when the communication interface(s) 228 again establish communication with the controller 110.

At step 314, the processors 226 wait a routine delay interval. In some embodiments, the wait operation is performed by the processors 226 placing certain of the components of the user monitoring device 104 into a sleep mode to conserve battery 222 power. A wake up timer is started to wake up the device 104 a predetermined delay interval later. Similar to the routine sensor data selected to send at step 312, the routine delay interval may be dynamically changed by the processors 226 according to whether the user monitoring device 104 is in an on-shift mode or an off-shift mode. For example, the routine delay interval in the on-shift mode may be less than the routine delay interface in the off-shift mode. In this way, the user monitoring device 104 will send the routine sensor data back to the controller 110 more frequently when the user is working (on duty) than when the user is off duty.

In preferred embodiments, the routine wait interval may at any time be interrupted in the event a high priority signal or sensor value is received. For example, in some embodiments, even during the routine wait interval, the processors 226 monitor the buttons 240 for whether the SOS button is pressed. If yes, the processors 226 immediately cut short the delay interval to process the SOS and send a corresponding SOS message to the controller 110.

After the routine delay interval is completed (either by reaching the end of the delay interval or by being cut short due to a high priority input signal), control returns back to step 304 to again monitor the user and see if an emergency event is confirmed (step 310). As long as no emergency event is confirmed, a loop is formed in the process of FIG. 3 via the "no" branch of step 310 such that the processors 226 will periodically send back routine sensor data to the controller 110, where the specific routine sensor data to send and frequency of sending the data dynamically changes depending on the on-shift/off-shift mode. Alternatively, if an emergency event is confirmed at step 310, the routine loop is broken and control proceeds to step 316.

At step 316, since an emergency event has been confirmed, either by the controller 110 sending an emergency mode start message to the user monitor device 104 at step 308 or by the processors 226 automatically confirming the emergency event according to sensor 220 or button 240 data at steps 304, 306, the processors 226 activate an emergency mode. This may be done by updating the mode 234 of the device 104 to be an emergency mode in the storage device 230.

At step 318, the processors 226 send an emergency mode start acknowledgement to the controller 110. This message lets the controller 110 know that the user monitoring device 104 has now entered the emergency mode.

At step 320, the processors 226 send an emergency set of sensor data to the controller 110. This step is similar to step 312 except now the specific sensor data to send is selected by the processors 226 according to an emergency configuration. In some embodiments, the emergency set of sensor data includes all collected sensor 220, button 240, and GPS 223 data. In this way, even if the mode of the device 104 was previously set to be off-shift (because the user is no longer on shift), in the event that an emergency event is confirmed, the user device will begin to send to the controller 110 all the available sensor 220 data including GPS 223 location information.

At step 322, the processors 226 wait an emergency delay interval. This step is similar to step 314 except now the processors 226 sleep the various components for the emergency delay interval instead of the routine delay interval. In some embodiments, the emergency delay interval may be the shorter delay interval such that once an emergency event is confirmed, the user monitoring device 104 will more frequently send sensor data back to the controller 110. Again, in some embodiments, the emergency delay interval may also be cut short by the processors 226 if a certain high priority input signal is received such as an SOS button 240 being pressed or other sensor data reaching a critical level.

At step 324, the user is again monitored. The various sub-steps 326 (collect sensor data), step 328 (collect button data), and step 330 (receive controller data) generally correspond to as described above for steps 304, 306, and 308. A repeated description is thus omitted for brevity.

At step 332, the processors 226 determine whether the emergency event is continued. Similar to step 310, this may be done by the processors 226 looking for an emergency mode end message from the controller 110 or by automatically detecting the end of the emergency event according to either button 240 or sensors 220, 223 on the user monitoring device 104.

In some embodiments, once activated, the emergency mode must be ended by an explicit message received from the controller 110, which will only be sent in response to a human monitoring operator and/or emergency dispatch operator (ED) manually confirming the emergency event should end.

As long as the emergency event is continued, control returns to step 320 to again send the emergency set of sensor data to the controller 110. This "yes" branch from step 332 thereby forms an emergency loop such that the processors 226 will periodically send back the emergency set of sensor data to the controller 110 (step 320) where the frequency of sending occurs according to the emergency delay interval (step 322).

In the event the emergency event is not continued, control proceeds to step 334 to activate the routine mode. This may be done by the processors 226 updating the mode 234 to be the routine mode in the storage device 230.

At step 336, the processors 226 send an emergency mode end acknowledgement to the controller 110. This message lets the controller 110 know that the user monitoring device 104 has returned to the routine mode. Control then proceeds to step 312 to send the routine set of sensor data to the controller 110 and the routine loop is thereby entered until another emergency event is confirmed at step 310.

Figure 4:
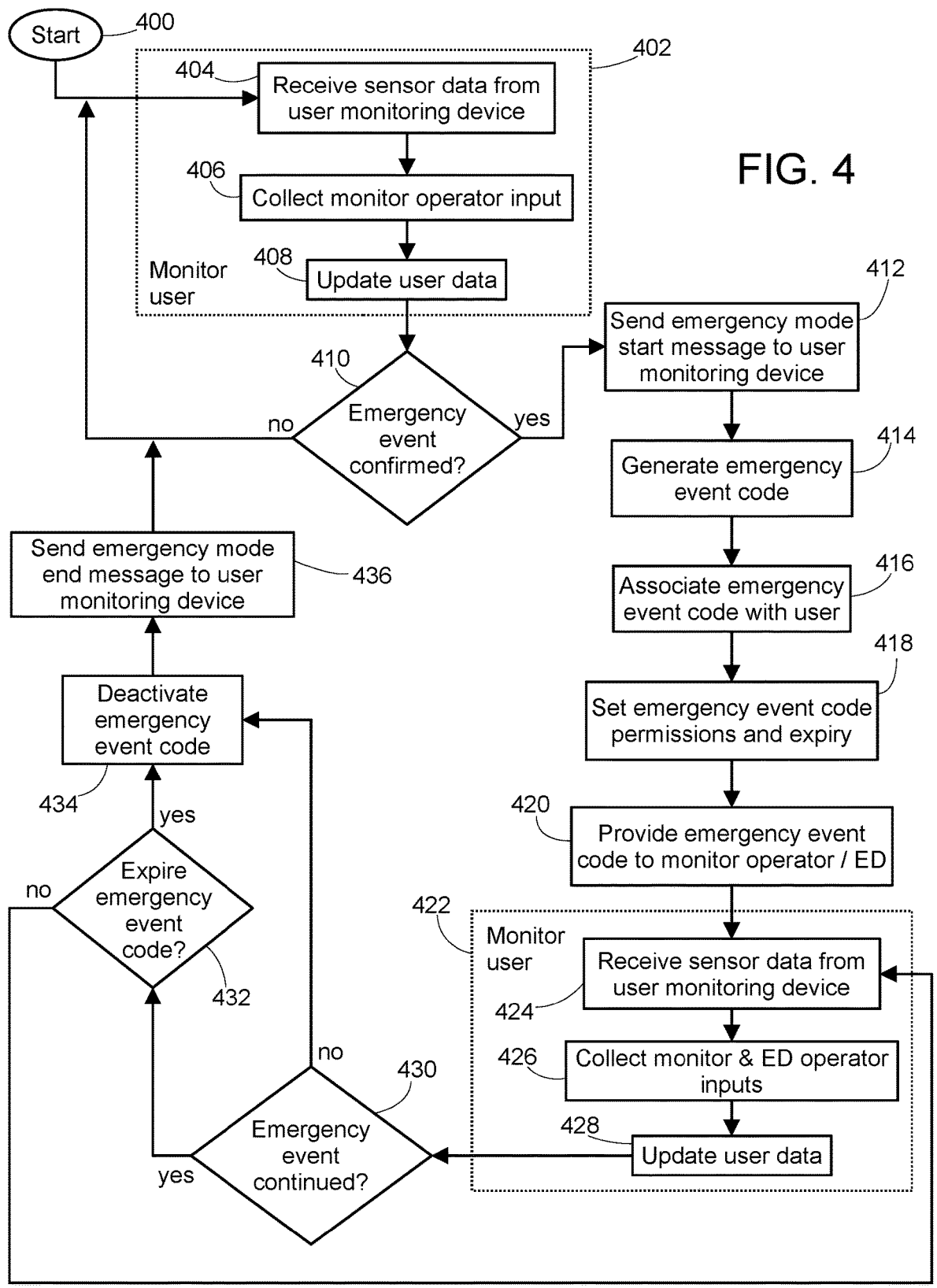
FIG. 4 shows a flowchart of a method of monitoring a user as performed by the controller of FIG. 2 according to an exemplary embodiment.

FIG. 4 shows a flowchart of a method of monitoring a user as performed by the controller 110 of FIG. 2 according to an exemplary embodiment. The steps of FIG. 4 may be performed by processors 200 of the controller 110 executing the controller software 214 loaded from the storage devices 202. The steps of the flowchart are not restricted to the exact order shown, and, in other configurations, shown steps may be omitted or other intermediate steps added. Although FIG. 4 illustrates the operations of the controller 110 in monitoring a single user, this is for convenience of description and understanding. It is to be understand the same process as illustrated in FIG. 4 is respectively running on the controller 110 for each of a plurality of remote users being respectively monitored by the controller 110.

The process begins at step 400, which may correspond to power up of the controller 110.

At step 402, the processors 200 monitor a particular user. This is done in three sub-steps including step 404 where the processors 200 receive sensor data from the user monitoring device 104 associated with the user being monitored. For example, the controller 110 may receive at step 404 sensor data from a bracelet monitoring device 104 worn by a lone worker or other user.

At sub-step 406, the processors 200 collect monitor operator input. In some embodiments, user data 208 stored by the controller 110 is accessed by various monitoring terminals 114 and/or status monitoring devices 106 where human monitoring operators keep tabs on the users being monitored. For instance, a web based user interface (UI) screen provided by a webserver 216 running on the controller 110 may provide graphical and written information in real time about a plurality of users being monitored by the controller 110. Alerts may be automatically generated by the controller 110 to bring to the attention of human monitoring operators that one or more remote users may be experiencing an emergency situation. For instance, the processors 200 may determine when a particular aspect of the sensor data associated with a user crosses a predetermined threshold and send an alert for notifying a monitoring operator of a potential emergency associated with the user. A concrete example may be heart rate of a particular user exceeding a predetermined beats-per-minute threshold, or one or more required check-in messages not being received within a predetermined minimum check-in frequency. Other methods of detecting potential emergency events and triggering alerts may be used such as machine learning and/or neural networks. In response to these alerts, the human monitor operators may provide input to the controller 110 such as activating an emergency event condition associated with a user. Such input from the monitoring operators is received by the processors 200 of the controller at step 406.

At step 408, the processors 200 update the user data 208 associated with the user and stored in the storage devices 202 according to the various information received and collected at steps 404 and 406. For instance, in some embodiments, the user data 208 is organized in one or more database tables such that both current and historic information about a particular user can be quickly retrieved by the processors 200. A relational database is utilized to store the data in some embodiments; however, the term "database" and "data" as utilized in this description is meant to refer to any stored collection of organized data.

At step 410, the processors 200 determine whether a user being monitored is confirmed to be experiencing an emergency event. In some embodiments, the human monitoring operators will provide input to the controller 110 to make this confirmation at step 408 and thus the processors 200 rely on the monitoring operator input at step 410. However, in some embodiments, the controller 110 may also automatically confirm an emergency event for a user such by determining when a particular aspect of the sensor data crosses a second predetermined threshold that indicates a confirmed emergency associated with the user.

When an emergency event is confirmed for a particular user, control proceeds to step 412; alternatively, control returns to step 404 to continue monitoring the particular user.

At step 412, because an emergency event is confirmed for the user, the processors 200 of the controller 110 generate and send an emergency mode start message to the user monitoring device 104 associated with that user. The emergency mode start message informs the user monitoring device 104 to switch to the emergency mode—for instance, the emergency mode start message may be received by the user monitoring device 104 at step 308 and cause the "yes" branch of step 310 to be followed in FIG. 3.

At step 414, the processors 200 of the controller 110 generate an emergency event code. In some embodiments, the code is a unique identifier for identifying a particular emergency event. The emergency event code in some embodiments is a one time code that is unique to one emergency event such that each new emergency event that is confirmed at step 410 will have a different emergency event code generated at step 414, even if the new emergency event is being experience by a same user that had previously experienced an emergency event. In other words, in some embodiments, the emergency event code is not itself a user identifier but identifies a particular emergency situation.

In some embodiments, the code is an alphanumeric string that looks random but is relatively short such that it is easy for humans to read and type into a computer terminal. For instance, an example emergency event code may be a six-digit string such as "CAB838".

At step 416, the processors 200 store in the emergency event code data 212 in the one or more storage devices 202 an association of the emergency event code with the user that was confirmed to be experience the emergency event at step 410. By default, the processors further store a status indication that the emergency event code is active when the code is generated.

At step 418, the processors 200 further set one or more emergency event code permissions and expiry. For instance, in some embodiments, the permissions by default include all the user data associated with the user experiencing the emergency; however, in some embodiments, the permissions may by default only allow access to recent user data within a certain number of hours such as 24 hours. Human monitoring operators may set these and/or other permissions when confirming the emergency event and activating the emergency mode by interacting with webpage user interface screens provided by the webserver 216, for example.

The expiry of the emergency event code refers to when the code will be automatically considered for deactivation. For instance, the expiry may be date-time value stored for the code that is automatically calculated to be some number of hours (e.g., 4 hours) after the code is generated at step 414. In some embodiments, the human monitoring operators may set other expiry times besides a default time when confirming the emergency event and activating the emergency mode by interacting with webpage user interface screens provided by the webserver 216, for example.

As shown in the flowchart of FIG. 4, once an emergency event is confirmed for a particular user at step 410, the "yes" branch leads to the processors 200 generating a unique emergency event code for the event, associating the emergency event code with the user experiencing the emergency, and setting various permissions and/or expiry of the code. In some embodiments, these steps 414, 416, 418 occur in response to the processors 200 receiving a message from the monitoring operator at step 406 confirming the particular user is experiencing an emergency event.

At step 420, the processors 200 of the controller 110 provide the emergency event code to the monitoring operator and/or emergency dispatch operators.

In some embodiments, the webserver 216 of the controller 110 provides two separate website platforms—a first website for access by monitoring operators being employees of each company that is remotely monitoring users, and a second website for access by emergency dispatch operators. In some embodiments, the first website is an internal website only accessible on a virtual private network or other private corporate computer network for each company that is utilizing the controller to monitor employees. In some embodiments, either or both of the second website may be a publicly available website accessible on the public Internet. In some embodiments, the two websites are implemented by a single website where user permissions based on username/password or other credentials determine whether a user is logged in as either a monitoring operator of a particular company or an emergency dispatch user.

Figure 6:
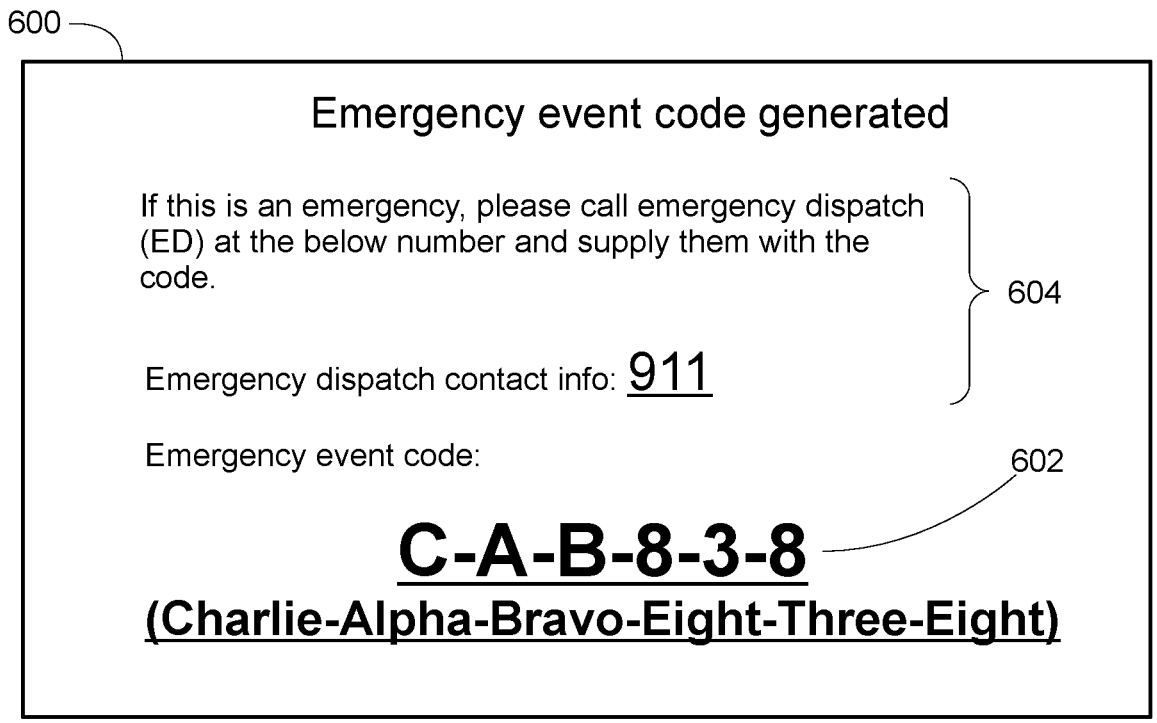
FIG. 6 illustrates a user interface screen generated by the controller for providing a monitoring operator with a newly generated emergency event code and emergency dispatch contact info in response to an emergency event being confirmed according to an exemplary embodiment.

The processors 200 providing the emergency event code at step 420 to one or more monitoring operators may be done by generating a webpage confirmation screen after a human monitoring operator has confirmed an emergency event is occurring for a particular user. An example of a user interface screen providing the newly generated emergency event code associated with an emergency event to a monitoring operator is shown in FIG. 6 (described in more detail later).

The processors 200 may further provide the emergency event code to an applicable emergency dispatch (ED) 116 at step 420. This may be done in some embodiments utilizing an API of the ED clearing house 120. Alternatively, if the emergency dispatch (ED) operator is currently logged in to the webserver provided by the controller 110, one or more popup or other alert messages may be generated for display by the processors 200.

Other methods of providing the emergency event code to one or both of the monitoring operators and/or emergency dispatch 116 at step 420 include emails, text messages, automated phone calls, push messages to mobile phones acting as status monitoring devices 106, etc. Any desired method of notification may be made and multiple notifications may be sent to a plurality of recipients so that all appropriate monitoring entities and/or emergency dispatch locations are made aware of the emergency event code.

At step 422, the user is again monitored and updated user data 208 is stored in the storage devices 202. The various sub-steps 424 (receive sensor data from user monitoring device 104), step 426 (collect monitor and ED operator inputs), and step 428 (update user) generally correspond to as described above for steps 404, 406, 408. A repeated description is thus omitted for brevity. However, it should be noted that at step 426, the processors 200 now further collect inputs from the emergency dispatch (ED) 116 operators. As will be explained further with respect to FIG. 8, emergency dispatch (ED) 116 operators are able to access user data associated with the user associated with the emergency event code. While accessing this data, an emergency dispatch (ED) 116 operator may also add inputs such as to recommend ending the emergency event (i.e., if the emergency is resolved), to report misuse, or to add notes associated with the event. These inputs may be entered by the emergency dispatch (ED) 116 operator by interacting with user interface controls provided on a webpage generated by the webserver 216 of the controller 110—see FIG. 8, for example.

At step 430, the processors 200 determine whether the emergency event is continued. Similar to step 410, this may be done by the processors 200 looking for an emergency mode end input from a human monitoring operator or by automatically detecting the end of the emergency event according to information stored in the user data 208. In some embodiments, an emergency mode end input may also be received from the emergency dispatch (ED) 116 operator at step 426. In some embodiments, once an emergency event code is activated, that same emergency event code can only be deactivated by an explicit input received from a human user—either the monitoring operator and/or the emergency dispatch (ED) 116 operator. In some embodiments, both the monitoring operator and/or the emergency dispatch (ED) operator must agree to end the emergency event and deactivate the associated emergency event code by both pressing a resolve or end button on their respective webpage user interface screens provided by the webserver 216 of the controller 110.

When the emergency event is continued (i.e., not ended), control proceeds to step 432; otherwise, when the emergency is ended, control proceeds to step 434.

At step 432, the processors 200 determine whether to expire the ongoing emergency event code. In some embodiments, once the expiry time of the emergency event code is reached (i.e., expiry as set at step 418) or within a predetermined range of the expiry, the processors 200 will being prompting one or both of the human monitoring operators and emergency dispatch operators. These prompts will seek information one whether the emergency event code should be deactivated or whether the emergency event is still ongoing. For example, the prompt may offer to automatically extends the expiry associated with the emergency event code by a predetermined number of minutes (e.g., 60 minutes).

One reason to set an expiry and automatically prompt in this manner when the expiry is reached is to avoid resolved emergency event codes from lingering in the system 100. For instance, an emergency event could be very quickly resolved such as in a false alarm situation; however, due to the realization that the event was a false alarm, the human monitoring operators may have their attention directed to more pressing events and forgot to mark the emergency event resolved. This may occur in the case of multiple simultaneous emergency events involving different users.

When input is received from the monitoring operator (and/or emergency dispatch operator) at step 432 indicating that the emergency event code should be expired, control proceeds to step 434; otherwise, if the input received indicates that the emergency event is still ongoing, control returns to step 422 to continuing monitoring the user and updating the user data.

In some embodiments, the controller 110 may also automatically expire (i.e., deactivate) emergency event codes after a predetermined expiry such as 24 hours of inactivity.

At step 434, the processors 200 deactivate the emergency event code, which may be done by changing a status of the code from "active" to "inactive" in the emergency event code data 212 in the one or more storage devices 202.

At step 436, the processors 200 generate and send an emergency mode end message to the user monitoring device 104 associated with the user who is associated with the emergency event code that has now expired. The emergency mode end message informs the user monitoring device 104 to switch to back to the routine mode—for instance, the emergency mode end message may be received by the user monitoring device 104 at step 330 and cause the "no" branch of step 332 to be followed in FIG. 3.

After sending the emergency mode end message to the user monitoring device 104 at step 436, control then returns to step 404 to begin monitoring the user again until another emergency event is confirmed at step 410.

Figure 5:
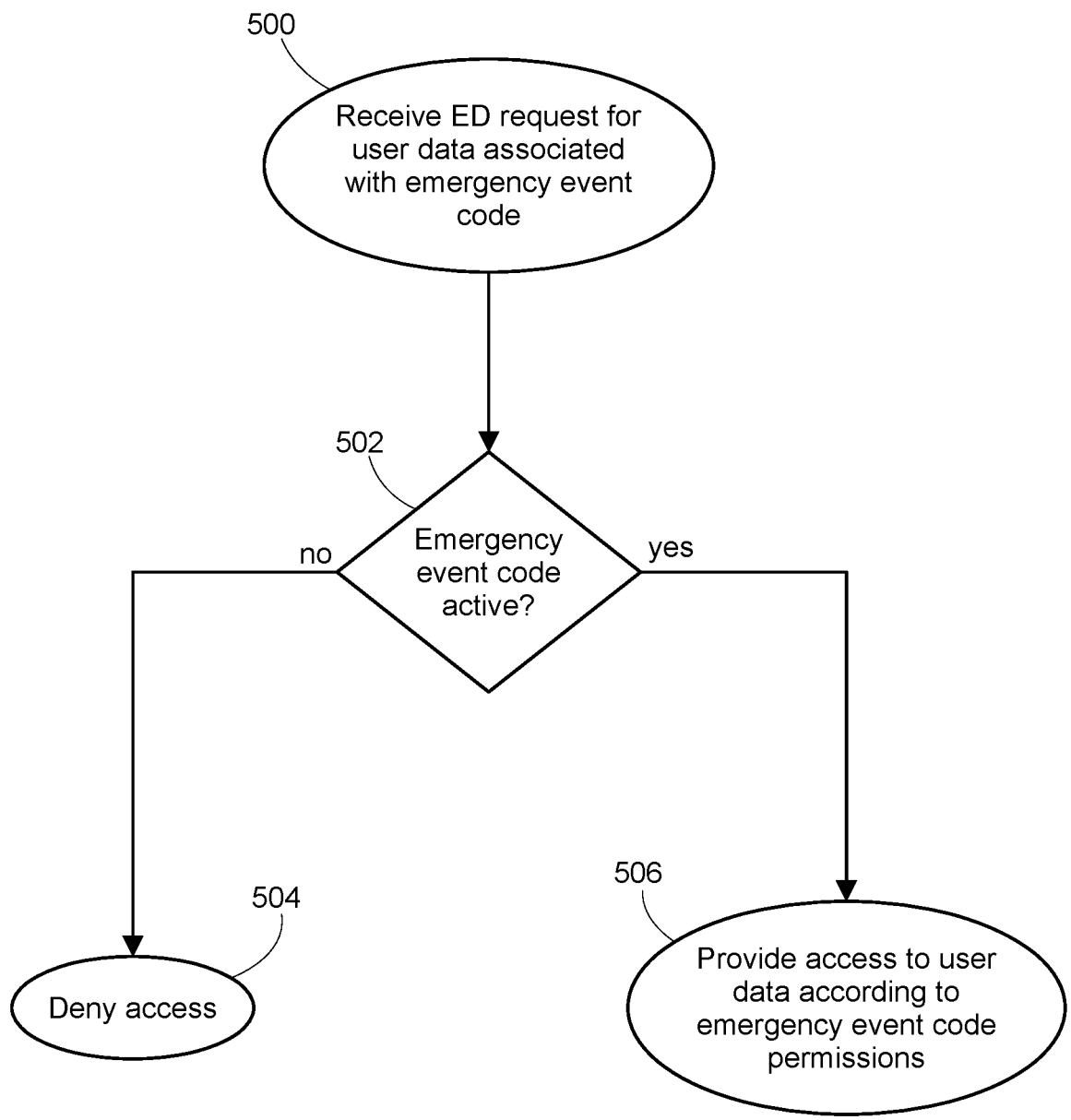
FIG. 5 shows a flowchart of a method of processing requests to access user data received from an emergency dispatch (ED) operator as performed by the controller of FIG. 2 according to an exemplary embodiment.

FIG. 5 shows a flowchart of a method of processing requests to access user data 208, the requests being received from an emergency dispatch (ED) 116 operator, and the method as performed by the controller 110 of FIG. 2 according to an exemplary embodiment. The steps of FIG. 5 may be performed by processors 200 of the controller 110 executing the webserver software 216 loaded from the storage devices 202. The steps of the flowchart are not restricted to the exact order shown, and, in other configurations, shown steps may be omitted or other intermediate steps added.

The process begins at step 500 when the processors 200 receive a request for user data from emergency dispatch (ED) 116. For example, this request may take the form a webpage request such as a hypertext transfer protocol (HTTP) POST method message received by the webserver 216 running on the controller 110. Other types of requests such as custom API or other web methods may be utilized in a similar manner. The request includes an emergency event code as inputted into a webpage field by an emergency dispatch (ED) operator—see FIG. 7, for example.

At step 502, the processors 200 of the controller 110 determine whether the emergency event code included in the request received at step 500 is active. This may be done by the processors looking up the emergency event code in the emergency event code data 212 to check whether the status associated with the received emergency event code is active. When yes, control proceeds to step 506; alternatively, when no, control proceeds to step 504.

At step 504, the processors 200 deny access. This is done by replying to the user data access request received at step 500 with an access denied message when determining that the emergency event code received from the emergency dispatcher 116 is not active.

Figure 8:
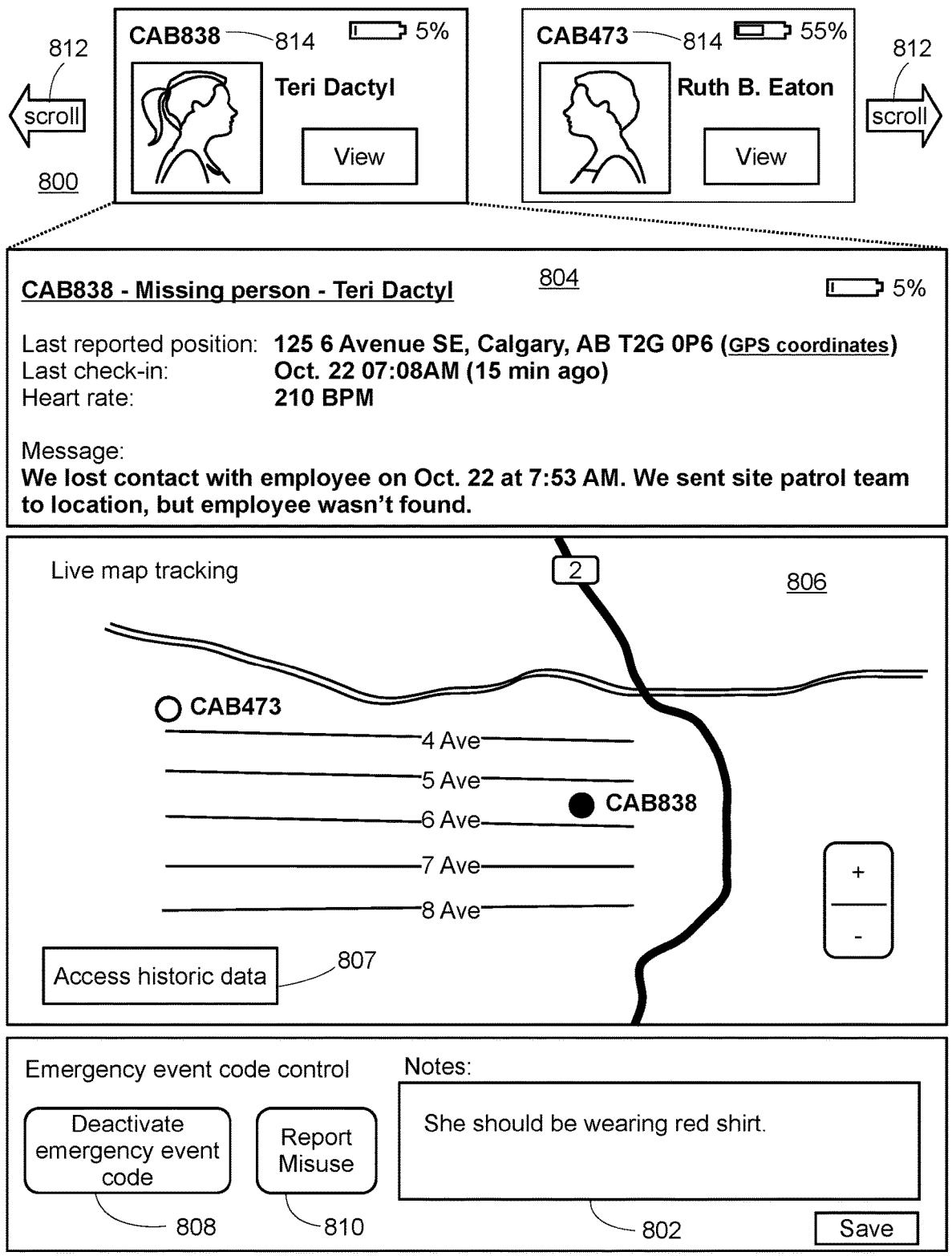
FIG. 8 illustrates a user data screen for providing information associated with an active emergency event code to an emergency dispatcher (ED) operator according to an exemplary embodiment.

At step 506, the processors 200 allow access to the user data 208 of the user associated with the emergency event code. The actual user data 208 to which access is allowed may be controlled according to the permissions set at step 418 and may include all or only a part of the total user data 208 stored at the controller 110 for the user in question. Permitting access to the user data 208 will generally involve sending a portion of the user data 208 back to the emergency dispatch (ED) 116 operator such as by providing a webpage with user data information—an example of such a webpage is shown in FIG. 8 for example. In general, the processors 200 at step 506 reply to the user data access request with one or more parts of the user data 208 associated with the user when determining that the emergency event code received from the emergency dispatcher 116 at step 500 is active.

FIG. 6 illustrates a user interface screen 600 generated by the controller 110 for providing a monitoring operator with a newly generated emergency event code and emergency dispatch 116 contact info in response to an emergency event being confirmed according to an exemplary embodiment. For example, the screen 600 of FIG. 6 may be generated by the webserver 216 on the controller 110 at step 420 in order to provide the emergency event code to the monitoring operator via a terminal 114 at the monitoring operator platform 112.

As illustrated, the emergency dispatch contact information and instructions to call said emergency dispatch location 116 is provided. Although 911 is displayed in the example of FIG. 6, different phone numbers may be displayed if the applicable emergency dispatch location 116 needs to be dialed using different numbers. Part of the process of step 420 in some embodiments involves the controller 110 determining the appropriate emergency dispatch contact information to associate with the emergency event code. This is done in some embodiments by the processors 200 of the controller 110 searching emergency dispatch data 210 in the storage devices 202 according to a last known position of the user experiencing the emergency in order to find the appropriate emergency dispatch location 116 that covers the geographical location of the user. The emergency dispatch (ED) data 210 includes contact numbers for each ED location 116 along with the geographical area covered by that ED location 116. The contact number for the appropriate ED location 116 as determined by the controller 110 is displayed on the UI screen 600 of FIG. 6 to facilitate the human monitoring operator to call the correct ED location 116.

Also shown on the UI screen 600 of FIG. 6 is the emergency event code 602 utilizing both alphanumeric digits and also spelled out using phonetic alphabet for reading over the phone such as by the user saying "C as in Charlie, A as in Alpha, B as in Bravo". Instructions 604 are provided telling the monitoring operator to call the appropriate emergency dispatch (ED) location 116 at the listed contact information and tell them the emergency event code 602.

Figure 7:
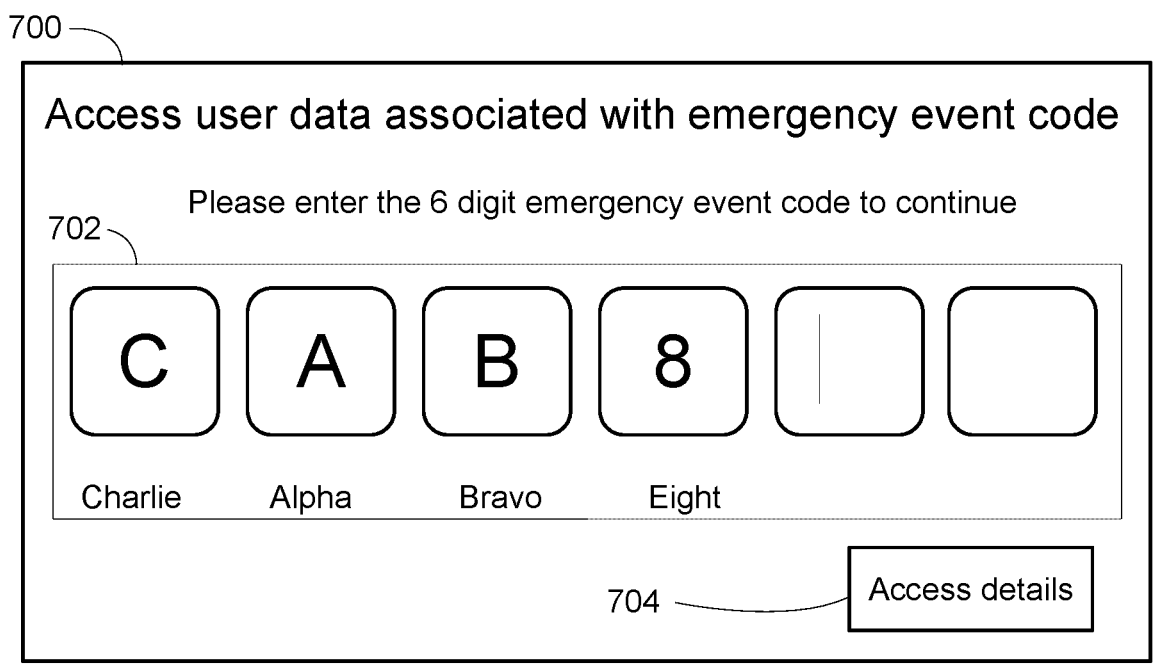
FIG. 7 illustrates a user interface screen generated by the controller for allowing an emergency dispatcher (ED) operator to request access to user data associated with an emergency event code according to an exemplary embodiment.

FIG. 7 illustrates a user interface screen 700 generated by the controller for allowing an emergency dispatcher (ED) 116 operator to request access to user data 208 associated with an emergency event code 602 according to an exemplary embodiment. For example, the screen 700 of FIG. 7 may be generated by the webserver 216 of the controller 110 when accessed by an emergency dispatch (ED) 116 operator after the ED operator is informed of the emergency event code 602 (either automatically at step 420 or manually by being verbally told by a monitoring operator following the instructions 604 provided in the UI screen 600 of FIG. 6). The URL for accessing the webserver 216 of the controller 110 may be bookmarked or otherwise saved at the emergency dispatch (ED) computer terminal 118 to facilitate ED operators handling callers that have emergency event codes 602.

As illustrated, the UI screen 700 of FIG. 7 includes an input field 702 for entering the emergency event code 602. In some embodiments, this input field 702 dynamically prints the phonetic spelling of each alphanumeric character in real time as each character is typed by the ED operator. This helps the ED operator confirm the characters being entered match the characters of the emergency event code 602 orally provided by the monitoring operator over the phone.

Once the code 602 is correctly entered into field 702, the emergency dispatch (ED) 116 operator presses the access details button 704 in order to send a user data access request to the controller 110. For instance, pressing the access details button 704 will result in the generation of an HTTP POST method request being received by the webserver 216 of the controller 110 at step 500 in FIG. 5. Assuming the emergency event code 602 entered into field 702 is active, the flowchart of FIG. 5 will reach step 506 and the controller 110 will provide a user data screen associated with the emergency event code 602.

FIG. 8 illustrates a user data screen 800 for providing information associated with an active emergency event code 602 to an emergency dispatcher (ED) 116 operator according to an exemplary embodiment. For example, the screen 800 of FIG. 8 may be generated by the webserver 216 on the controller 110 at step 506 of FIG. 5 when the processors 200 determine that the emergency event code 602 received from the emergency dispatcher is active.

In this embodiment, the user data screen 800 includes a plurality of user data information about the user experiencing the emergency and the information is updated in real time as changes to the user data occur. For example, the screen 800 is updated as notes 802 are entered by the monitoring operator(s) and emergency dispatcher(s) and as new sensor data is received from the user monitoring device 104 worn by the user associated with the emergency event code 602. Examples of user data information 804 includes personal details of the user such as name and age. Last reported position may be provided based on the GPS 223 data last received from the user monitoring device 104. Heart rate may be provided based on the sensor data 232 last received from the user monitoring device 104. The position information may also be displayed in map form 806 and access to historic data 807 may also be provided so that emergency dispatch (ED) can see the direction the user was travelling and heart rate trends or other biometric changes over time.

Some control inputs are also provided to the emergency dispatch (ED) 116 operator including a button 808 for deactivating the emergency event code and another button 810 for reporting misuse. A notes field 802 is also provided for inputting and recording additional information.

The top of the screen 800 includes a scrollable list 812 of other active emergency event codes simultaneously 814 accessed by the ED operator thereby allowing the ED operator to quickly switch between different ongoing emergency events.

A similar screen 800 such as FIG. 8 may also be generated and displayed to monitoring operators and any information entered by the emergency dispatch and the monitoring operators such as notes 802 will update in real time on both screens 800.

Figure 9:
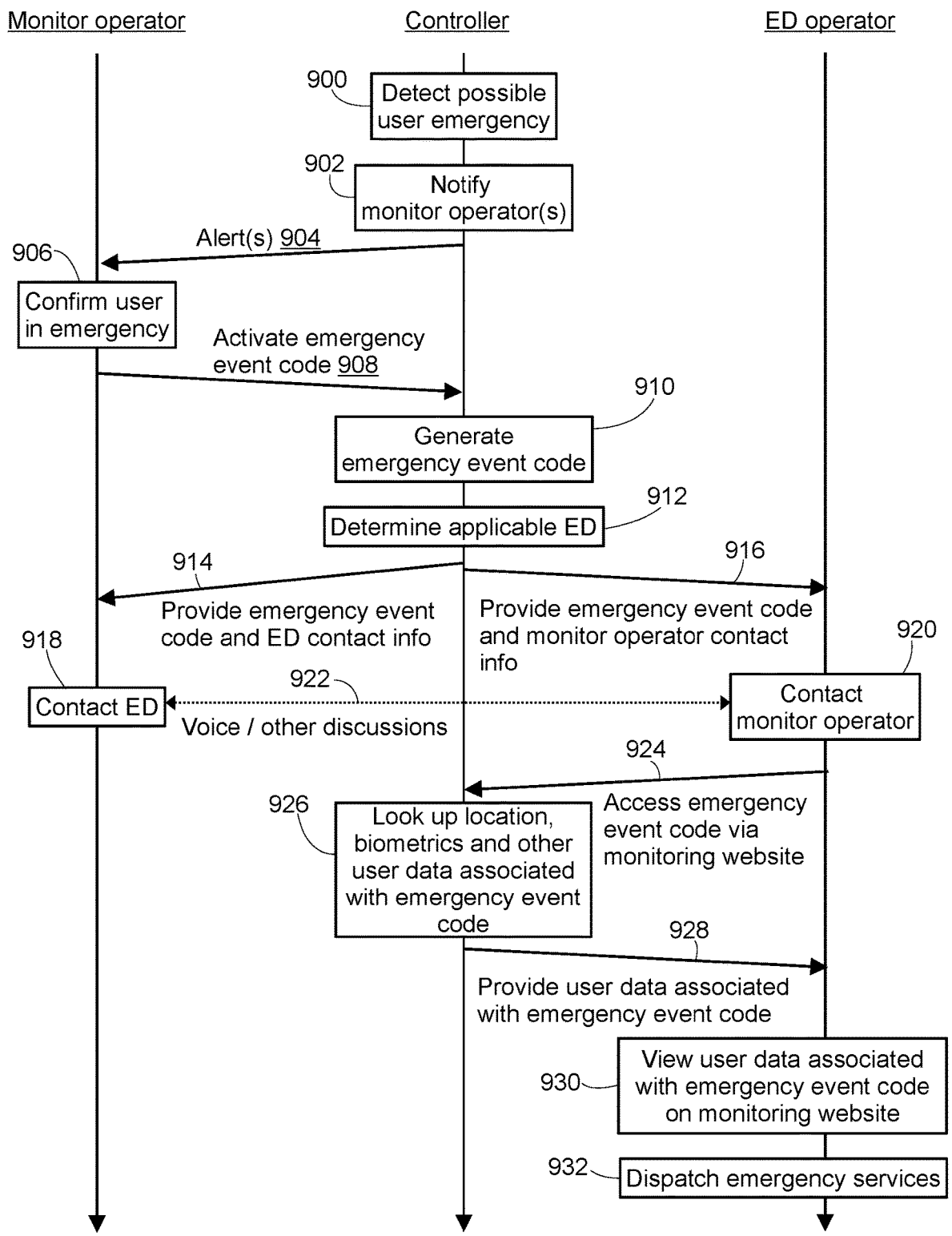
FIG. 9 illustrates a timeline diagram illustrating a method of utilizing the system of FIG. 1 by a monitor operator and an emergency dispatch (ED) operator according to an exemplary embodiment.

FIG. 9 illustrates a timeline diagram illustrating a method of utilizing the system of FIG. 1 by a monitor operator located at the monitoring operator platform 112 and an emergency dispatch (ED) operator located at an emergency dispatch location 116 according to an exemplary embodiment.

At step 900, the controller 110 detects a possible user emergency. For instance, the controller 110 may determine when a particular aspect of the sensor data such as heart rate of a user crosses a predetermined threshold such as a maximum allowable beats per minute (BPM).

At step 902, the controller 110 sends one or more alerts 904 for notifying one or more monitoring entities of a potential emergency associated with the user. In a simple example, an alert 904 is sent to the monitoring terminal 114 utilized by a monitoring operator responsible for monitoring the user's safety. However, other team leads and/or family members or other users may also be notified by their own alerts 904 in a similar manner. The alert(s) are shown as the arrow line 904 in FIG. 9

At step 906, the monitoring operator who received the alert 904 confirms the user is experiencing an emergency. In some cases, the confirmation may be done solely based on the sensor data received from the user monitoring device 104 at step 404. In other cases, the confirmation may further take into account additional considerations. For instance, if a routine check-in is missed by a particular user, the controller 110 may generate an alert 904 and the monitoring operator may attempt to make a phone call to the mobile device of the user who missed the routine check in. In the event that the call is not answered, the monitoring operator may confirm the user is experiencing an emergency by clicking an activate emergency event code button for the user on a UI screen provided to the monitoring operator by webserver 216. The message to activate the emergency event code is shown in FIG. 9 as the arrow line 908.

At step 910, the controller 110 generates an emergency event code 602 to associate with the event and user, and at step 912 the controller 110 determines the appropriate emergency dispatch (ED) location 116 based on the last known geographical location of the user experiencing the emergency. The controller 110 then provides the emergency event code 602 and ED contact information 604 to the monitoring operator (arrow line 914) and further may also provide the emergency event code 602 and monitoring operator contact information to the emergency dispatch (ED) (arrow line 916). In some embodiments, steps 910, 912 and arrow lines 914, 916 of FIG. 9 generally correspond to steps 412 to 420 of FIG. 4. Arrow line 914 may further correspond to sending the emergency event code 602 generated screen 600 of FIG. 6 to the monitoring operator.

At steps 918 and 920, the monitoring operator contacts the emergency dispatch such as by calling the ED contact number provided on UI screen 600 of FIG. 6 and then verbally telling the answering emergency dispatch (ED) operator the emergency event code 602 as displayed on the UI screen 600 of FIG. 6. These voice discussions between the monitoring operator and emergency dispatch operator are indicated in FIG. 9 by bidirectional arrow line 922. Other types of communications besides voice calls may also be utilized in a similar manner.

In some embodiments, the emergency dispatch (ED) 116 operator may at step 920 also proactively contact the monitoring operator by initiating a call to the monitoring operator according to contact information received from the controller 110.

Arrow line 924 represents the emergency dispatch (ED) 116 operator sending a user data access request to the controller 110 including the emergency event code 602. For instance, arrow line 924 may represent the request generated after the ED operator enters the emergency event code 602 into the UI screen 700 of FIG. 7 and pressed the access details button 704.

At step 926, the controller 110 performs the process of FIG. 5 to ensure the emergency event code 602 received from the ED operator is valid and then looks up the location, biometrics and other user data 208 associated with the emergency event code 602. The controller 110 then sends back user data 208 associated with the emergency event code 602 to the emergency dispatch 116 operator. Arrow 928 may correspond to the webserver 216 of the controller 110 sending webpage data forming the user data screen 800 of FIG. 8 to the emergency dispatch operator's terminal 118.

At step 930, the emergency dispatch (ED) operator views the user data 804, 806 associated with the emergency event code 602 on the monitoring website provided by the webserver 216 of the controller 110. This step may correspond to the ED operator viewing the user data screen 800 of FIG. 8.

At step 932, the emergency dispatch (ED) dispatches the appropriate emergency services. The actual dispatching process is done in the usual manner by the emergency dispatch (ED) operator, but now the ED operator has full visual access to the user data screen 800 of FIG. 8. The emergency event code 602 provided to the ED operator allows the ED operator to access user data 208 associated with the emergency event code 602 without needing all that user data information 208 to be verbally conveyed from the monitoring operator. Instead, both the ED operator and the monitoring operator can see the user data in a visual format such as illustrated in the screen 800 of FIG. 8 while discussing the case. Changes to the user data 208 are also updated in substantially real time on the screen 800 of FIG. 8 so the ED operator has instant access to the latest data. Accuracy and speed are both thereby greatly improved.

FIG. 10 illustrates a user data privacy configuration screen 1000 that may be displayed on a user's mobile phone acting as a configuration device 106 according to an exemplary embodiment. The screen 1000 of FIG. 10 may be generated by a custom software application 254 running on the user's mobile phone acting as a configuration device 106, where the software application 254 allows the user's configuration device 106 (e.g., the user's mobile phone) to dynamically configure their associated user monitoring device 104 (e.g., the user's wearable bracelet).

In some embodiments, a communication interface 250 on the status monitoring device 106 such as a Bluetooth transceiver directly communicates with a corresponding communication interface 228 on the user monitoring device 104 such as another Bluetooth transceiver. In some embodiments, the configuration device 106 communicates with the monitoring device 104 by sending messages to the controller 110 in the cloud, which acts as an intermediary. For instance, a communication interface 250 such as Wi-Fi transceiver on the status monitoring device 106 may send reconfiguration commands via an access point (AP) 262 and the Internet 108 to the controller 110, which then sends corresponding reconfiguration commands down to the user monitoring device 106 via the Internet 108 and a GMS cell phone network 256 where they are received by a GSM transceiver type communication interface 228 on the user monitoring device 104.

The configuration screen 1000 of FIG. 10 is utilized in some embodiments to allow the user to custom-configure what set of routine sensor data is to be sent to the controller 110 while the user is off-shift (i.e., during personal time when not actively on duty for the company). In other words, the screen 1000 of FIG. 10 allows the user to customize an off-shift configuration 1002 specifying which information the user monitoring device 104 should send to the controller 110 at step 312 during an off-shift mode. In some embodiments, the user may at any time customize which information is to be sent to the controller while the monitoring device is in the off-shift mode 1002. For instance, in the example shown in FIG. 10, the user has elected to configure their user monitoring device 104 to only send SOS messages and battery life to the controller 110 while the user is off-shift. The send interval for the battery life updates is specified by the user to be 60 minutes. These configurations 1002 mean that at step 312 when the user is off-duty and the monitoring device 104 is in the routine mode, the routine set of sensor data only contains the battery life information and the routine delay interval at step 314 is 60 minutes.

The configuration screen 1000 of FIG. 10 also allows the user to see what sensor data will be sent to the controller 110 while the user monitoring device 104 is in the on-shift mode and during emergency events. The on-shift configuration 1004 specifies what set of routine sensor data is to be sent to the controller 110 while the user is on-shift (i.e., actively on-duty working for the company). Although the on-shift routine sensor data is also configurable, in some embodiments, the on-shift configuration 1004 shown on the screen 1000 of FIG. 10 to a regular user is by default locked as it is configured by the company information technology (IT) staff and is not normally allowed to be changed by workers themselves. However, an unlock button 1008 is provided in the event the user viewing the configuration screen 1000 of FIG. 10 is an IT staff member or has the necessary permissions to change the on-shift configuration 1004. In the example shown in FIG. 10, the company has elected to configure the user monitoring device 104 to send all available sensor data (i.e., location, biometrics, SOS signals, check ins, and battery life) to the controller 110 while the user is on-shift. The send interval for sending the routine information is specified at 45 minutes. These configurations 1004 mean that at step 312 when the user is on-duty and the monitoring device 104 is in the routine mode, the routine set of sensor data contains all available information and the routine delay interval at step 314 is 45 minutes.

Similarly, the emergency configuration 1006 is also displayed in FIG. 10. The emergency configuration 1006 overrides both the on-shift and off-shift configurations 114, 1002 in the event the user monitoring device 104 enters the emergency mode. Similar to the on-shift configuration 1004, in this embodiment, the emergency configuration 1006 is configured by the company IT staff and is therefore locked by default to the user. The user may view the information but not change it without first unlocking 1010, which may require IT staff credentials to unlock 1010. In the example shown in FIG. 10, the company has elected to configure the user monitoring device 104 to send all available sensor data (i.e., location, biometrics, SOS signals, check ins, and battery life) to the controller 110 while the user monitoring device 104 is in the emergency mode 1006. The send interval for sending the emergency set of sensor data is specified at 5 minutes. These configurations 1006 mean that at step 320 when the monitoring device 104 is in the emergency mode, the emergency set of sensor data contains all available information and the emergency delay interval at step 322 is 5 minutes.

Figure 11:
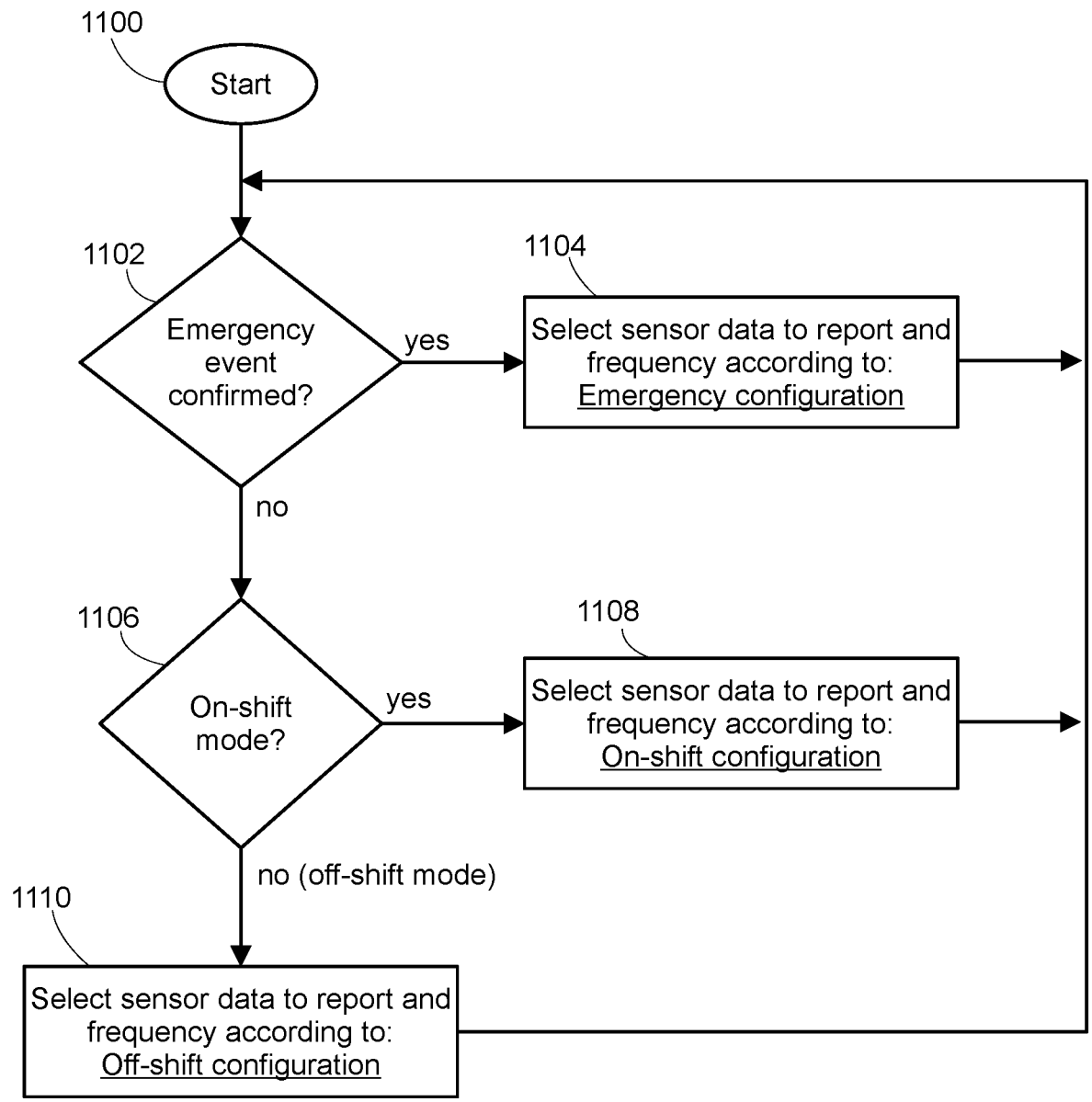
FIG. 11 illustrates a flowchart describing how the monitoring device selects information to send to the controller according to the configurations shown in FIG. 10 according to an exemplary embodiment.

FIG. 11 illustrates a flowchart describing how the monitoring device 104 selects information to send to the controller 110 according to the configurations 1002, 1004, 1006 shown in FIG. 10 according to an exemplary embodiment. The steps of FIG. 11 may be performed by processors 226 of the user monitoring device 104 executing the control software 238 loaded from the storage devices 230. The steps of the flowchart are not restricted to the exact order shown, and, in other configurations, shown steps may be omitted or other intermediate steps added.

The process beings at step 1100, which in some embodiments corresponds to power up of the user monitoring device 104.

At step 1102, the processors 226 of the user monitoring device 104 determine whether an emergency event is confirmed 1102. This step may be performed similar to as described above for step 310 and therefore a repeated explanation is omitted. When an emergency event is confirmed, control proceeds to step 1104; otherwise, control proceeds to step 1106.

At step 1104, the processors 226 select the sensor data to report to the controller 110 and the frequency to send said information based on the emergency configuration 1006.

At step 1106, the processors 226 determine whether the user monitoring device 104 is in the on-shift mode. In some embodiments, the mode setting 234 will be automatically updated according to user shift schedules including start and stop times and dates for when the user is on-shift. These schedules may be sent to the user monitoring device 104 by the controller 110 or may be manually entered or adjusted by the user via a UI screen of the custom software application 254 running on the user's mobile phone acting as a configuration device 106. In some embodiments, rather than or in addition to schedules, the user may also manually go on-shift by pressing a button on a UI screen 248 of the custom software application 254 running on the user's mobile phone acting as a configuration device 106. A physical button 240 may also be provided on the user monitoring device 104 itself for allowing the user to go on-shift. When the user monitoring device 104 is in the on-shift mode, control proceeds to step 1108; otherwise, control proceeds to step 1110.

At step 1108, the processors 226 select the sensor data to report to the controller 110 and the frequency to send said information based on the on-shift configuration 1004.

At step 1110, because the user monitoring device 104 is neither in the emergency mode nor the on-shift mode, it is deemed in this embodiment to be in the off-shift mode. Thus, the processors 226 select the sensor data to report to the controller 110 and the frequency to send said information based on the off-shift configuration 1002.

As shown in FIG. 11, the user monitoring device 104 sends sensor data to the controller 110 at each of a plurality of different times. The frequency of sending data is selected by the processors 226 of the user monitoring device 104 according to the mode setting 234, and the processors 226 include in the sensor data one or more sensor data types selected according to the mode setting 234 each time that the sensor data is sent to the controller 110.

Figure 12:
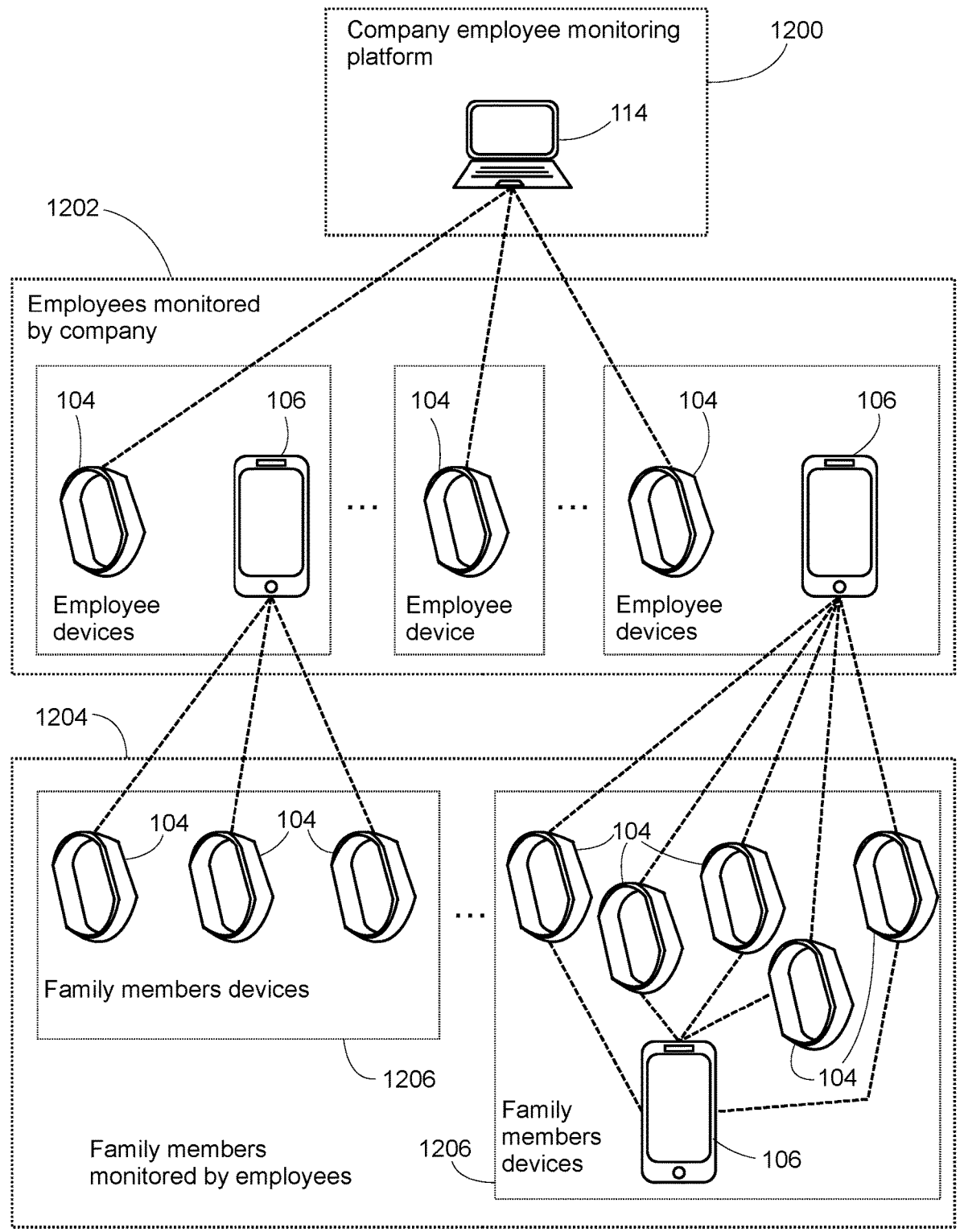
FIG. 12 illustrates a monitoring entity organizational diagram according to an exemplary embodiment.

FIG. 12 illustrates a monitoring entity organizational diagram according to an exemplary embodiment. In some applications, the system 100 of FIG. 1 and above described technology is utilized to monitor both employees of a company as well as family members of the employees. The top-level monitoring entity 1200 is the company employee monitoring platform 112 including one or more monitoring operator terminals 114. Under the company 1200 are the various employees 1202 being monitored by the company. The employee 1202 user devices include both a plurality of user monitoring devices 104 (i.e., bracelets worn by the employees) along with some employees having status monitoring devices 106 (i.e., mobile phones carried by the employees). Under the employees 1202 are family members 1204 of the employees and their devices again include monitoring devices 104 (i.e., bracelets) worn by the family members and status monitoring devices 106 (i.e., mobile phones) carried by some of the family members.

The dashed lines in FIG. 12 represent the direct monitoring entities responsible for each user monitoring device 104. For instance, the employee 1202 monitoring devices 104 are monitored by the company 1200. Likewise, the family member 1204 monitoring devices 104 are monitored by the employees 1202 and/or other family members 1204 such as spouses or guardians using mobile phones or other family terminals such as home computers.

All the various devices 1200, 1202, 1204 in FIG. 12 may communicate with a single central controller 110 of the system 100; however, monitoring entity permissions are configured as illustrated in FIG. 12 such that only authorized monitoring entities can see user information about certain users as indicated by the dashed lines.

As an example with reference to timeline diagram of FIG. 9, family member 1204 monitoring devices 104 send sensor data back to the controller 110 where it is stored and analyzed by the controller 110 at step 900 for potential emergencies. In the event that a potential emergency event is detected for a family member at step 900, the controller 110 at step 902 will notify the monitoring entities configured to monitor that family member 1204. In other words, the controller 110 may send alerts 904 to both the mobile phone 106 of the employee 1200 above the family member 1204 and/or additionally to a spouse of the employee. This may be useful, for example, to a company 1200 to monitor the safety of employees 1202 and also to allow those employees 1202 to leverage the same system 100 to monitor the safety of their family members 1204. In the event that a parent (or other monitoring entity) confirms an emergency event is occurring for a family member 1204, the controller 110 generates an emergency event code 602 and sends instructions 604 along with the contact information of the appropriate emergency dispatch (ED) location 116 to the mobile phone 106 of the parent 1204 (or other monitoring entity). The parent (or other monitoring entity) essentially acts as the monitoring operator in the above-described flowcharts and other diagrams.

In some cases, a parent who is on-shift at work may be unavailable to effectively handle an emergency situation involving a family member; thus, the controller 110 is configured in some embodiments to dynamically forward alerts to backup monitoring entities.

The monitoring entity organization may also be dynamically changed by the processors 200 of the controller 110 over time or in response to certain events. For instance, an employee device 1202 may be monitored by the company 1200 during on-shift mode but may be monitored by a spouse's 1204 mobile phone 106 during the off-shift mode. Alerts may also be forwarded between users depending on scheduling and/or availability.

Figure 13:
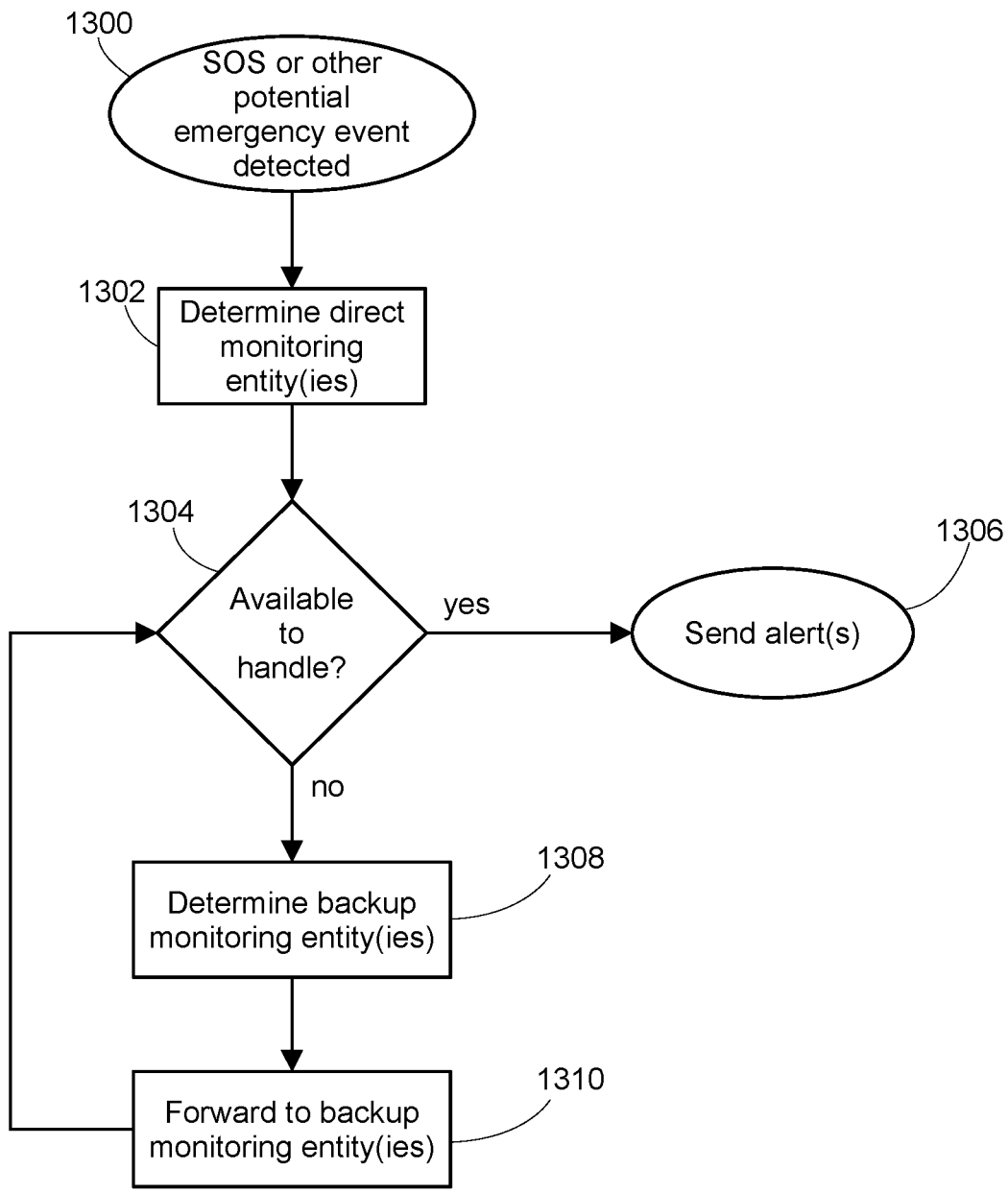
FIG. 13 shows a flowchart of a method of forwarding alerts to backup monitoring different entities while monitoring a user as performed by the controller of FIG. 2 according to an exemplary embodiment.

FIG. 13 shows a flowchart of a method of forwarding alerts to backup monitoring different entities while monitoring a user as performed by the controller of FIG. 2 according to an exemplary embodiment. The steps of FIG. 13 may be performed by processors 200 of the controller 110 executing the controller software 214 loaded from the storage devices 202. The steps of the flowchart are not restricted to the exact order shown, and, in other configurations, shown steps may be omitted or other intermediate steps added.

The process begins at step 1300 when an SOS message is received from a user monitoring device 104 or when some other potential emergency event is detected. Similar to step 900 of FIG. 8, step 1300 may be performed by the processors 200 of the controller 110 determining when a particular aspect of the sensor data received from a particular user monitoring 104 device crosses a predetermined threshold.

At step 1302, the processors 200 determine the direct monitoring entity or entities that are responsible for the monitoring the user device 104 from which the SOS message was received or other potential emergency event was detected at step 1300. The one or more direct monitoring entities may be configured and saved in the user data 208 at the controller 110 and may be visually represented as shown in the dashed lines of FIG. 12. For instance, the direct monitoring entity of an employee 1202 may be the company 1200 whereas the direct monitoring entity of a family member 1204 may be the employee user 1202 above that family member 1204 and/or may be another family member 1240 in the family member's group 1206. Again, the direct monitoring entity of a particular user may change over time such as changing from the employer 1200 being the direct monitoring entity while the user 1202 is on-shift to a family member 1204 being the direct monitoring entity while the user 1202 is off-shift.

At step 1304, the processors 200 determine whether the one or more direct monitoring entities determined at step 1302 are currently available to handle the SOS or potential emergency event. In some embodiments, this is done by the controller 110 checking the mode 234 of a user monitoring device 104 associated with the direct monitoring entity. For instance, when a family member 1204 is experiencing a potential emergency, the controller 110 may determine the direct monitoring entity is a particular employee 1202 and then check whether that employee's monitoring device 104 is currently in the on-shift mode or the emergency mode. When yes, the controller 110 may deem that employee user 1202 as being unavailable to handle the emergency event of a family member 1204. When the monitoring entity is deemed unavailable to handle the SOS or potential emergency, control proceeds to step 1308; otherwise, if the monitoring entity is deemed available to handle to the SOS or potential emergency, control proceeds to step 1306.

In some embodiments, alerts 904 are always sent to the direct monitoring entity determined at step 1302 and step 1304 is performed by the processors 200 of the controller 110 to see whether the alert 904 is handled within a predetermined period, i.e., whether it is handled within a timely manner. For instance, an alert 904 related to a family member 1204 may be sent to the status monitoring device 106 of an employee 1202 in the on-shift mode, but if it is not timely acted upon by the employee 1202, then the "no" branch of step 1304 will be followed to try a backup monitoring entity.

At step 1308, the processors determine one or more a backup monitoring entities. For instance, in some embodiments, the company 1200 may act as a backup monitoring entity for family members 1204. In this way, if an employee 1202 is unable to handle emergencies for family members 1204 due to the employee 1202 being on-shift or themselves experiencing an emergency, the company's monitoring operators 1200 will be notified as backup monitoring entities. Likewise, other family members 1204, friends or other users may also be configured as backup monitoring entities as desired. The specification of backup monitoring entities may be a setting configurable by users utilizing a UI screen of the software application 254 running on a status monitoring device 106 such as the user's mobile phone, for example.

At step 1310, the processors 200 of the controller 110 forward the alert 904 regarding the SOS or other potential emergency event to the one or more backup monitoring entities determined at step 1308. Control then returns to step 1304 to ensure that alert 904 is handled in a timely manner by the backup monitoring entity(ies). If not, a further backup monitoring entity may be selected and notified in a similar manner.

Figure 14:
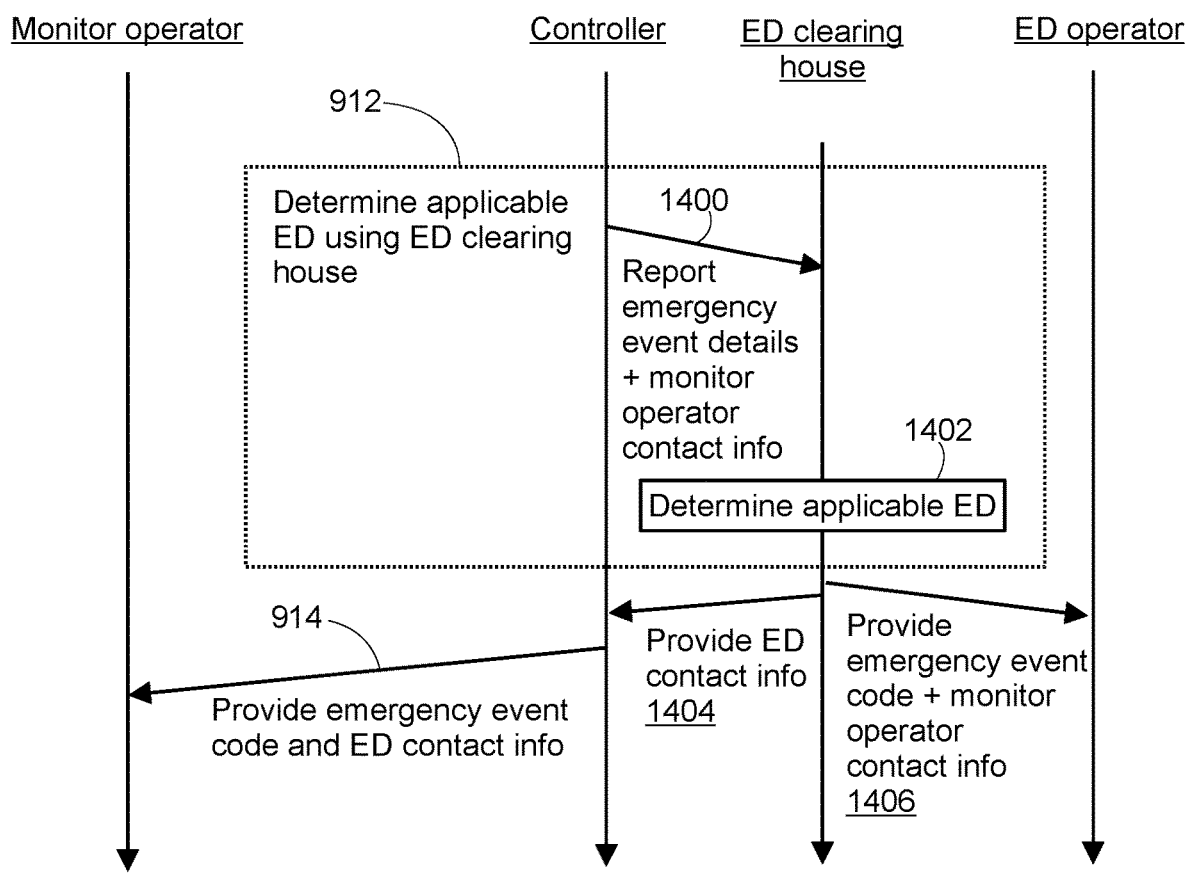
FIG. 14 illustrates a timeline diagram illustrating a method of leveraging an external emergency dispatch (ED) clearinghouse service to determine and notify an applicable emergency dispatch (ED) location according to an exemplary embodiment.

FIG. 14 illustrates a timeline diagram illustrating a method of leveraging an external emergency dispatch (ED) clearinghouse 120 service to determine and notify an applicable emergency dispatch (ED) location 116 according to an exemplary embodiment. The timeline diagram of FIG. 14 shows an alternative method of performing step 912 from FIG. 9. Whereas in FIG. 9, the controller 110 determines the appropriate emergency dispatch (ED) location 116 and optionally notifies that ED 116 of the emergency event code 602 and monitoring operator contact information, in FIG. 14, the controller 110 leverages an external ED clearing house service 120 for this functionality.

At step 1400, the controller 110 reports details of the emergency event and contact information of the monitoring operator to the ED clearing house 120. This may be done by accessing an API provided by a computer server run by the ED clearing house 120. The emergency event details provided to the ED clearing house 120 include the nature and location of the emergency. Likewise, the emergency event details further include the newly generated emergency event code 602.

At step 1402, the ED clearing house 120 determines the appropriate emergency dispatch (ED) location 116 to handle the emergency. This may be done utilizing proprietary techniques of the ED clearing house 120 but will generally involve correlating the geographical location of the last known position of the user experiencing the emergency and the nature of the emergency to the appropriate ED dispatch location 116. The ED clearing house 120 then sends notifications both to the emergency dispatch (ED) location 116 and back to the controller 110. The notification back to the controller 110 includes the contact information of the appropriate ED location 116 determined at step 1402, and the controller 110 forwards this back to the monitoring operator along with the emergency event code 602 similar to as previously described for arrow 914 in FIG. 9. The notification to the ED location 116 includes the emergency event code 602 and monitoring operator contact information. In this way, both the monitoring operator and the ED operator are aware of each other's contact information and can establish voice or other types communication in order to discuss the user data 208 associated with the emergency event code 602.

Figure 15:
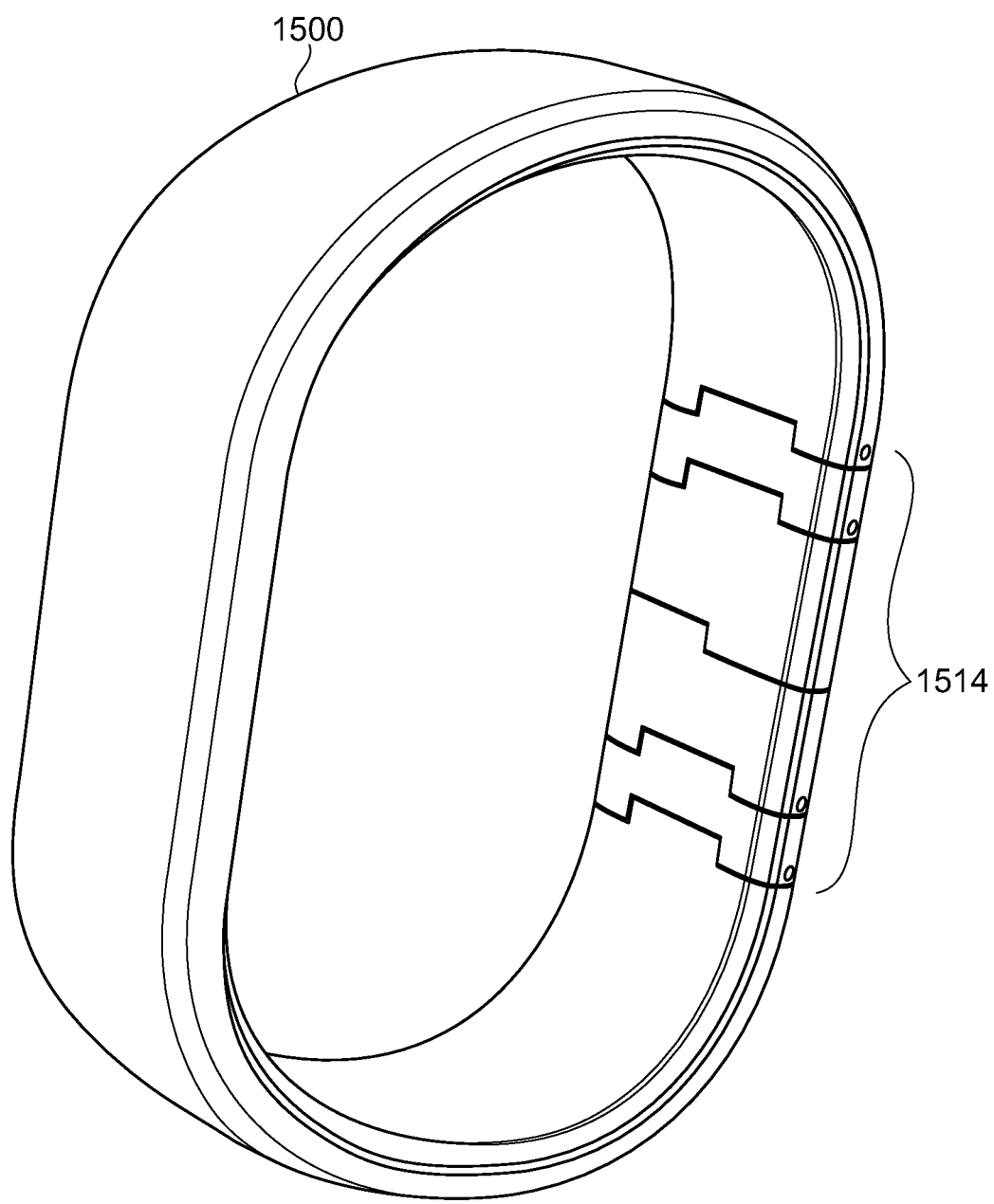
FIG. 15 illustrates a first perspective view of the bracelet for acting as a user monitoring device according to an exemplary embodiment
Figure 16:
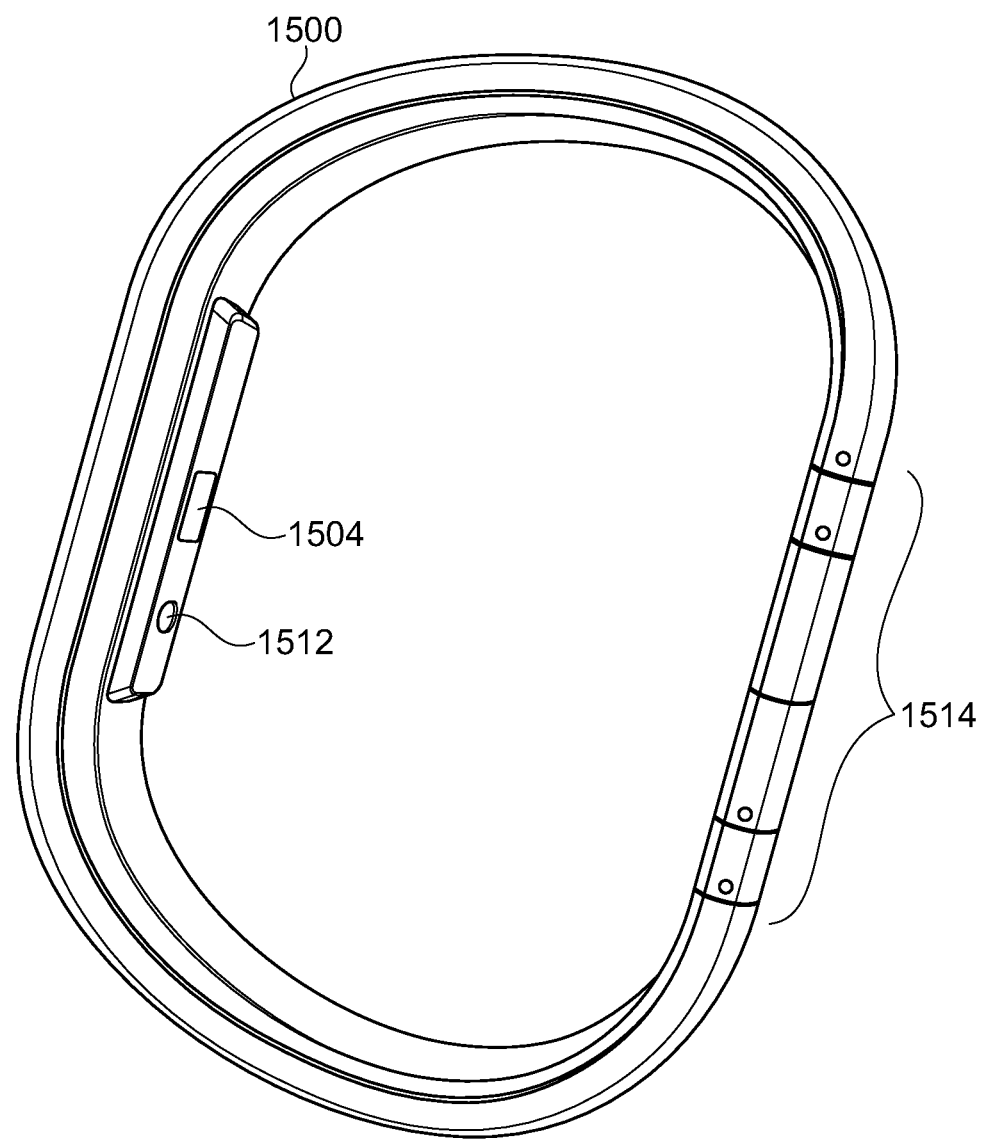
FIG. 16 illustrates a second perspective view of the bracelet of FIG. 15.
Figure 17:
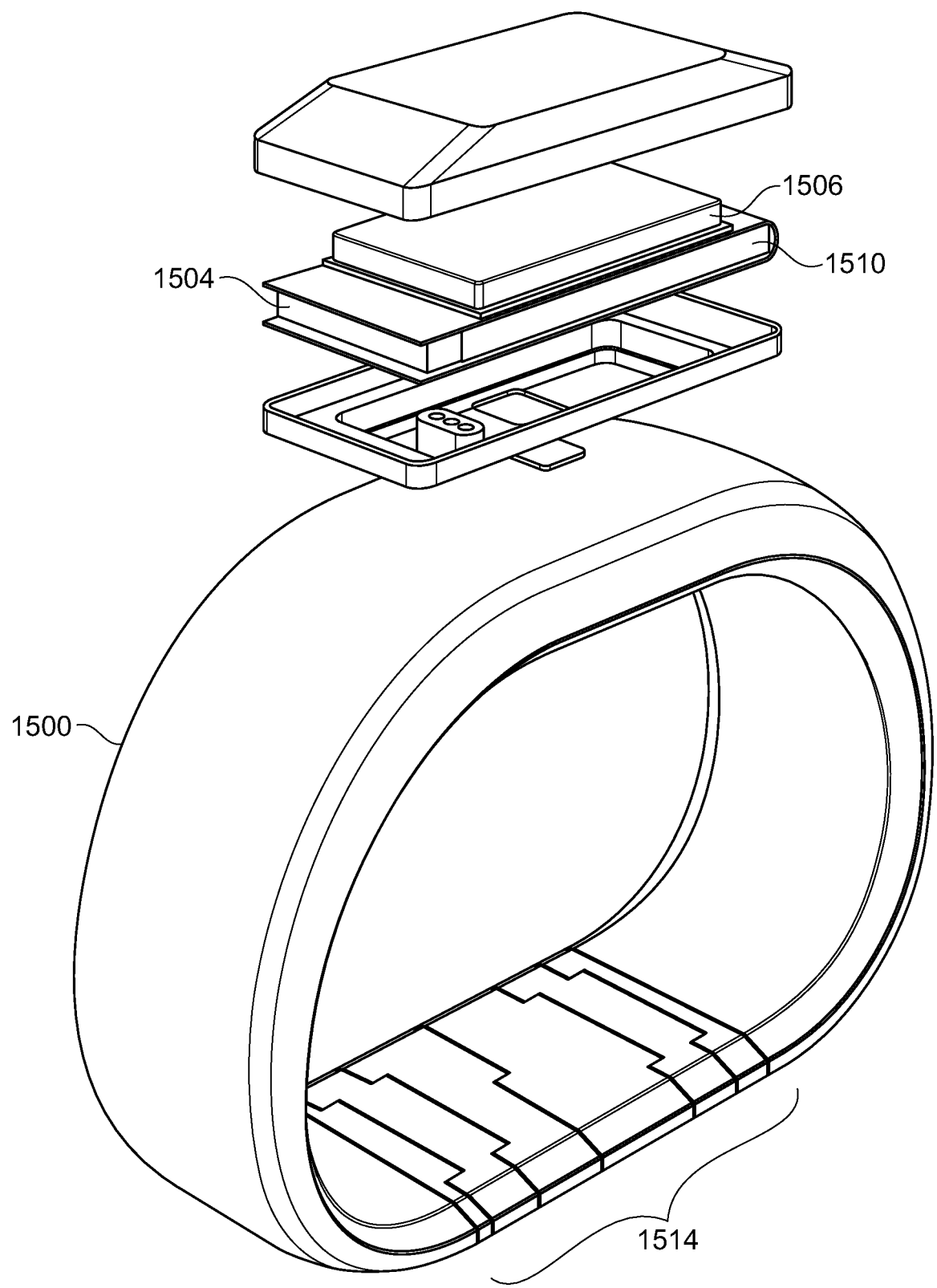
FIG. 17 illustrates an exploded view of the bracelet of FIG. 15.
Figure 18:
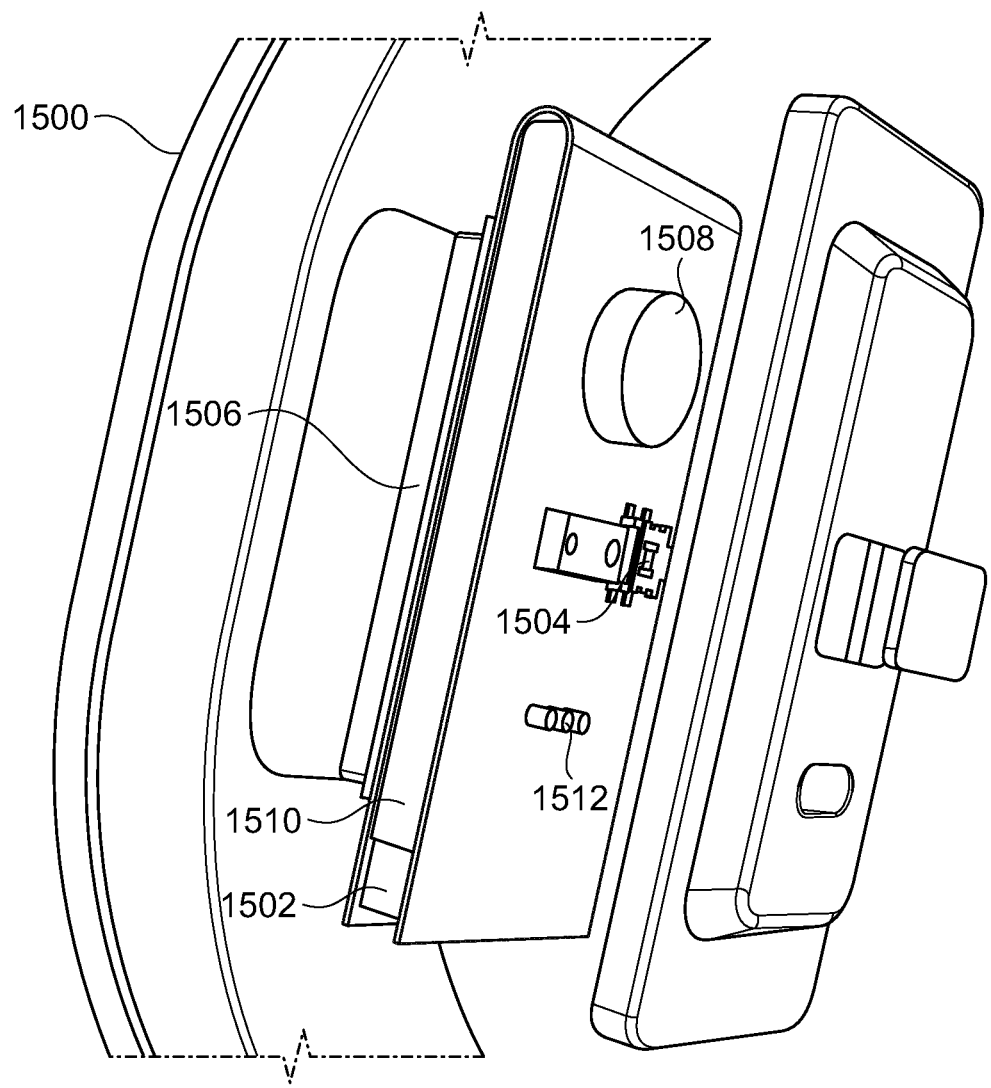
FIG. 18 illustrates a close-up exploded view of certain components such as the battery, button, GPS, biometric sensors and control board of the bracelet of FIG. 15.
Figure 19:
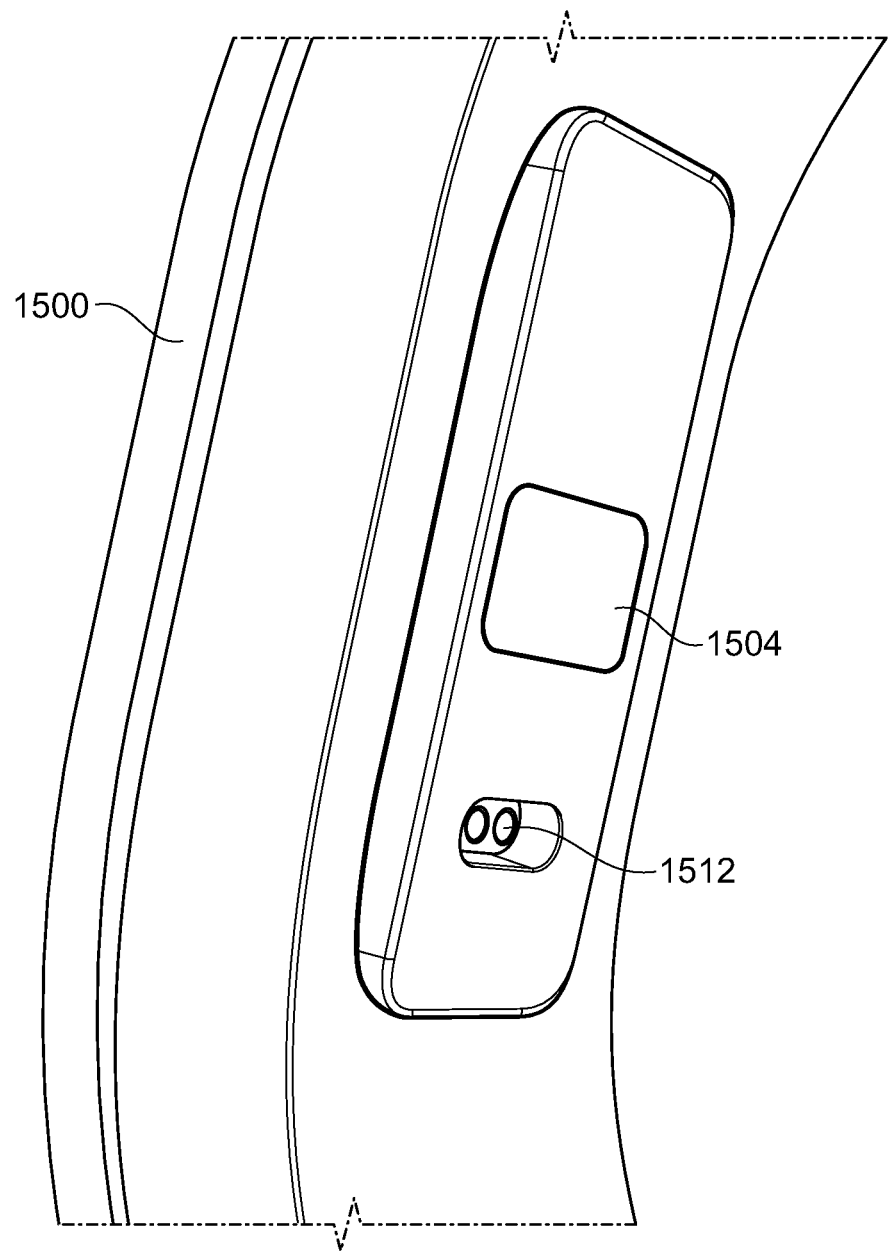
FIG. 19 illustrates a close-up perspective view of battery charge terminals and button of the bracelet of FIG. 15.
Figure 20:
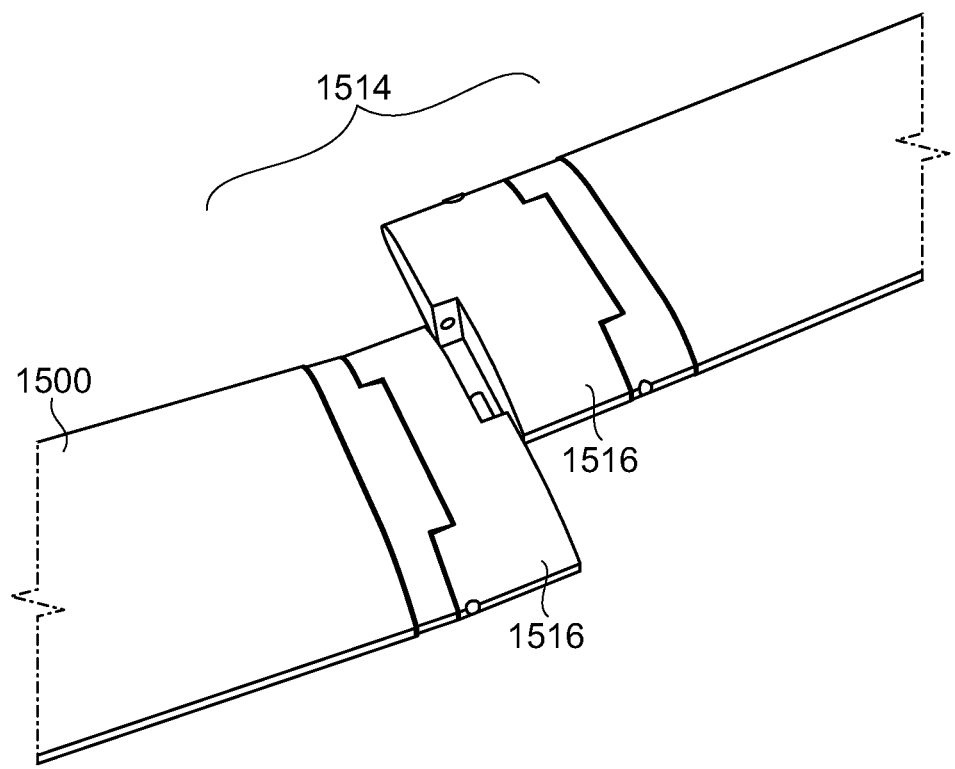
FIG. 20 illustrates close-up view of a strap connection mechanism of the bracelet of FIG. 15.
Figure 21:
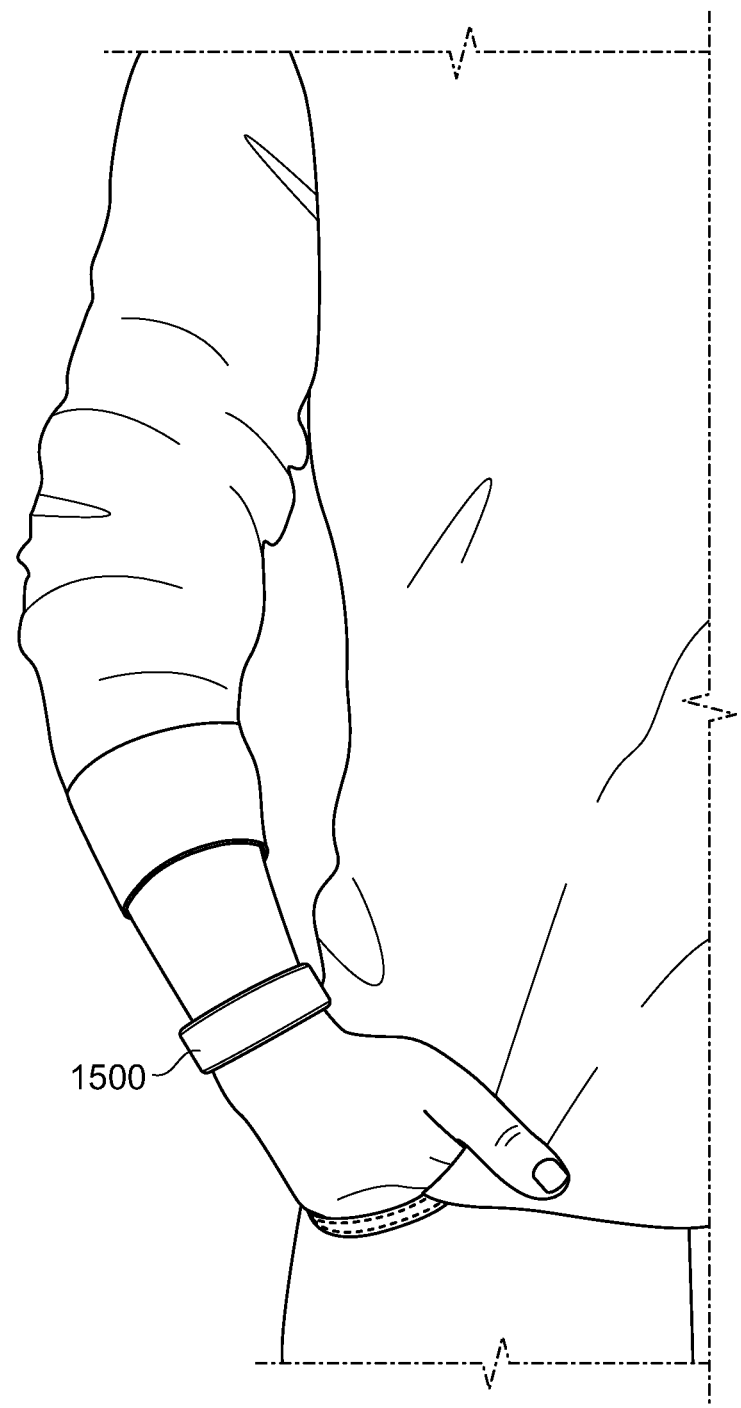
FIG. 21 illustrates a perspective view of a user wearing the bracelet of FIG. 15.

FIGS. 15-21 illustrate various views of a bracelet 1500 for acting as a user monitoring device 104 according to an exemplary embodiment. In particular, FIG. 15 illustrates a first perspective view of the bracelet 1500, FIG. 16 illustrates a second perspective view of the bracelet 1500, FIG. 17 illustrates an exploded view of the bracelet 1500, FIG. 18 illustrates a close-up exploded view of certain components such as the battery 1502, button 1504, GPS 1506, biometric sensors 1508 and control board 1510 of the bracelet 1500, FIG. 19 illustrates a close-up perspective view of battery charge terminals 1512 and button 1504 of the bracelet 1500, FIG. 20 illustrates close-up view of a strap connection mechanism 1514 of the bracelet 1500, and FIG. 21 illustrates a perspective view of a user wearing the bracelet 1500.

Beneficially, in the embodiment of FIGS. 15-21, when worn by a user, the bracelet 1500 appears to other users visually as a simple rubber wristband without any apparent electronic functionality. From external appearances, the bracelet 1500 does not appear to be a monitoring device and thus may stay on the user longer in the event of a hostage situation or other hostile emergency event. The bracelet 1500 may be offered in different colors and the size may be adjusted by the addition and removal of band sections 1516 as illustrated to fit different users.

In an exemplary embodiment, a system 100 for remote user monitoring includes a user monitoring device 104 and a controller 110. The controller 110 receives sensor data from the user monitoring device 104 and updates stored user data 208 accordingly. Upon confirmation of an emergency associated with a particular user, the controller 110 generates an emergency event code 602, associates the code 602 with the particular user, and sends the code 602 to a monitoring operator to provide to emergency dispatch. When receiving a user data access request 924 including the emergency event code 602 from an emergency dispatcher, the controller 110 only provides user data 208 associated with the particular user when determining that the emergency event code 602 received from the emergency dispatcher is active. The user monitoring device 104 may store an on-shift configuration 1004 specifying which information to send to the controller 110 during an on-shift mode and an off-shift configuration 1002 specifying which information to send during an off-shift mode, and may dynamically change modes 234 at different times.

Although the invention has been described in connection with preferred embodiments, it should be understood that various modifications, additions and alterations may be made to the invention by one skilled in the art without departing from the spirit and scope of the invention. For example, although the above description has focused on a company 1200 monitoring employees 1202 and optionally family members 1204 of employees 1202, the disclosed technology in different embodiments may similarly be utilized by any monitoring entity to monitor any type and number of remote users. For instance, in some embodiments targeting consumers, family members act as the monitoring entity/operators for other family members. Likewise, in additional to monitoring remote users, the technology may also be utilized to monitor physical items.

Although FIG. 1 illustrates the user monitoring devices 104 (e.g., bracelets) and configuration and status monitoring devices 106 (mobile phones) being coupled to the controller 110, it is intended to be understand that this connection may be intermittent. For example, the user monitoring devices 104 (e.g., bracelets) and configuration and status monitoring devices 106 (mobile phones) may buffer data locally and send/receive data to and from the controller 110 when a connection is available.

Although the above examples illustrate providing emergency dispatch (ED) 116 with monitoring operator contact information and emergency event code, in some embodiments, the controller 110 does not take this action. For instance, with reference to FIG. 9, in some embodiments step 916 is omitted and the controller 110 only provides the ED contact information and emergency event code 602 to the monitoring operator at step 914. The monitoring operator then calls or otherwise contacts the emergency dispatch (ED) utilizing the contact info provided at step 914 to notifying the ED of the emergency event code 602.

In some embodiments, SOS messages and/or other high priority button 240 signals or sensor data are sent in real time by the monitoring devices 104 to the controller 110 and do not follow the flowchart of FIG. 3. In some embodiments, the routine delay interval 314 is automatically canceled and the processors 226 of the monitoring device 104 wake the device 104 up in the event that the user presses the SOS or another predetermined high priority button 240.

In some embodiments, the system 100 may be utilized as a lone worker solution. In some embodiments, the user monitoring device 104 includes one or more sensors 220 to collect and monitor biometrics through wearable. Biometrics may includes heart rate, blood oxygen, body temperature and blood pressure. With this data, the controller 110 creates for each user an individual 'biometric fingerprint'—this is each person's unique biometric baseline. The controller 110 may alert monitoring operators/entities to acute and extended variations. The user monitoring devices 104 may further collect and send to the controller location data (GPS 223) in order to pinpoint a person's location if there is an emergency. The combination of GPS 223 and biometric data 220 can alert to an array of incidents, i.e. a change in speed (from GPS 223) coupled with an acute change in biometrics 220 can alert to a vehicle accident. In some embodiments, the user monitoring device 104 is wearable and includes a GPS 220 and biosensor 220 in a silicon bracelet. A clasp mechanism 1514 similar to watch links versus bands may be utilized to adjust sizes. In some embodiments, the user monitoring device 104 is designed to be highly discrete/sleek—no logos, lights, watch-face.

In some embodiments, the above described functionality of the user monitoring devices 104 and status/configuration devices 106 may be integrated with other electronic devices carried or worn by the user. For instance, rather than a discreet, stand-alone bracelet, the user monitoring device 104 may be integrated within the functionality of a fitness tracker worn by the user. Likewise, the user monitoring device 104 may be integrated within a smartwatch or other wristwatch worn by the user.

Although it is beneficial in some embodiments that the user monitoring device 104 may include one or more communication interfaces 228 such as GSM transceivers for communicating with the controller via one or more networks 108, in other embodiments, the user monitoring device 104 leverages a mobile phone, laptop computer, or other nearby electronic device as an intermediary for communicating with the controller 110. In the latter case, for example, the user monitoring device and the mobile phone 106 of the monitored user may be employed as a cooperative pair of user devices in which the mobile phone 106 serves as such intermediary for all communications between the monitoring device 104 and the controller. The on-shift and on-shift configurations for determining which sensor data is transmitted to the controller may therefore be stored in the mobile phone 106 or other intermediary device rather than in the user monitoring device 204, so that all sensor data is communicated from the user monitoring device 104 to the mobile phone 106 or other intermediary device, whose software application 254 determines which, if any, sensor data to communicate onward to the controller 110 according to the current mode setting 234.

Although the above-description such as at steps 310, 332, 406, 410, 430, 900, 1102, and 1300 have focused on detecting potential and/or actual emergency events associated with a user by determining when a particular aspect of the sensor data associated with a user crosses a predetermined threshold, other methods of detecting potential and/or actual emergency events may be utilized. More sophisticated methods for determining a potential or actual emergency event associated with a user may not rely on predetermined thresholds. For instance, in some embodiments, the controller 110 and/or user device 104 determines a potential or actual emergency event using machine learning and/or a neural network that analyses a plurality of information associated with a remote user, which may include information in addition to the sensor data received from the user's monitoring device 104. An example of other information about a user that may be utilized to detect possible or actual emergency events is the user's work schedule and anticipated locations and expected arrival times based on the schedule. The controller 110 and/or user device 104 may also recognize possible and/or actual emergency events based on both historic sensor data and current sensor data associated with the user being monitored.

In some embodiments, the system 100 allows temporary access to location information to emergency dispatch personnel. The process goes directly from client to law enforcement/emergency dispatch—the client platforms link/track individuals, client platform generates temporary/permission based 'code' 602, this code 602 is verbalized to law enforcement (LE)/emergency dispatch (ED), and LE/ED platform enters code and gains access to location, biometric and personal data. The system 100 may also be integrated with NG91-1.

Although FIG. 10 illustrates three modes including: on-shift mode 1004, off-shift mode 1002, and emergency mode 1006, where each mode is configurable for what sensor data to send from the monitoring device 104 to the controller 110, other embodiments are also possible with any number of modes. For instance, in some embodiments, only two modes are provided: routine and emergency. In other embodiments, a single or a plurality of modes are provided.

FIGS. 10 and 11 shown and described above ensure that user privacy is maintained by only sending to the controller 110 certain types of sensor data based on the mode configuration settings 1002, 1004, 1006. For example, in the off-shift configuration 1002 mode shown in FIG. 10, only SOS messages and battery life information are sent from the user monitoring device 104 to the controller 110.

Figure 11A:
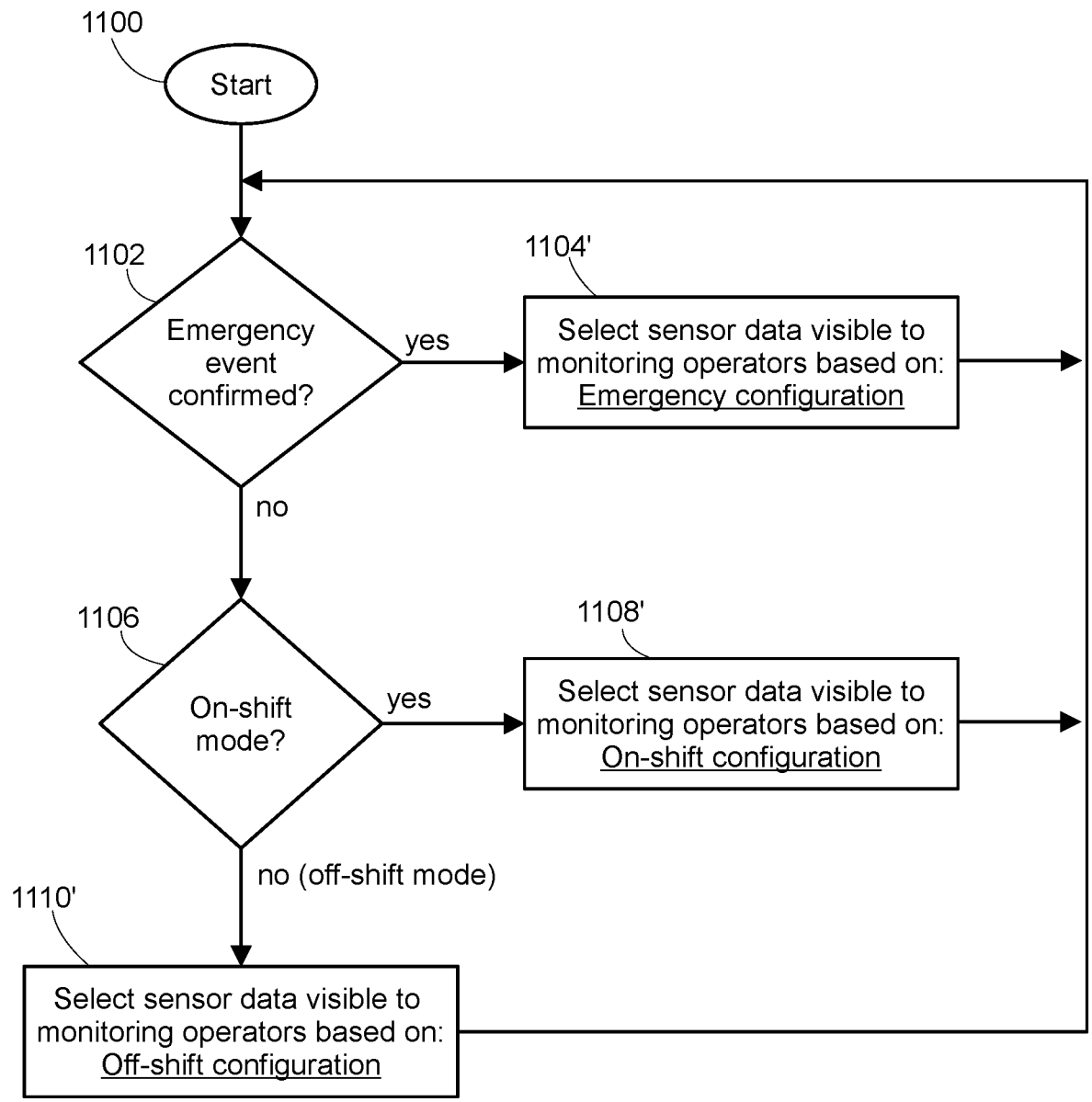
FIG. 11A illustrates a variant of the flowchart of FIG. 11, in which the controller instead receives all information from the monitoring device, and selects which information to make visible to the monitoring operator according to the configurations shown in FIG. 10 or 10A.

However, in other embodiments, all types of sensor data are always sent to the controller 110, and the mode configurations 1002, 1004, 1006 shown in FIG. 10 are utilized by the controller 110 to determine which aspects of the time-stamped user data are visible to monitoring and emergency dispatch operators, as illustrated in FIG. 11A, whose steps, unlike those of FIG. 11, are performed by the processor(s) 200 of the controller 110 executing the controller software 214. The steps themselves differ in that steps 1104', 1108' and 1110' select which sensor data to make visible to the monitoring operators on their status monitoring devices 106, rather than which data is reported to the controller 110. In this case, the mode configurations 1002, 1004, 1006 and mode setting 234 may be stored in the controller storage device(s) 202, along with the user shift schedules in embodiments that use such shift schedules to automatically update the mode setting 234. For instance, during a period of time that the mode setting is in an off-shift mode, all sensor data may be sent to the controller 110; however, the controller 110 only allows monitoring operators to view battery life data for the user within this time period. (I.e., the controller 110 hides other types of sensor data from the monitoring operators during this time period.) Then, in the event the mode switches to an emergency mode (such as after an emergency event is confirmed), the controller 110 now allows monitoring operators to view other additional data, such as location data to help facilitate emergency dispatch operators in locating the user, and, in at least some embodiments, also via at least a subset, if not all, of the biometric data, in order to facilitate more comprehensive reporting of the emergency details to the emergency dispatch operators. By contrast, during a period of time that the mode setting is in an on-shift mode, all or a subset of the biometric data may be made visible to the monitoring operators at all times during that period. Whether the configurations 1002, 1004, 1006 of FIG. 10 prevent the user monitoring device 104 from sending certain sensor data to the controller 110 (as illustrated in FIG. 11) or whether the configurations of FIG. 10 merely cause the controller to hide certain data during certain times (as illustrated in FIG. 11A) may be a user configuration setting.

The classification of the monitored user as either on-shift or off-shift is only one non-limiting example of different possible scenarios where distinction between two or more non-emergency mode configurations may be useful to respect a monitored user's privacy preferences. For example, while monitoring of lone workers in hazardous environments or scenarios may be mandated by law or employer policy, which may necessitate full biometric data reporting at all times that the worker is on-shift, lower risk workers who are not subjected to mandatory monitoring may nonetheless wish to benefit from participation in the system. In such a non-mandated monitoring context, the monitored user can choose between different modes, with different degrees of data sharing or data visibility, in the same manner described above using the on-shift/off-shift terminology, but according to the user's own discretion or privacy preferences, rather than having the data sharing/visibility level dictated by an on-shift or off-shift status.

FIG. 10A illustrates such an embodiment, where instead of on-shift and an off-shift modes, the two equivalents modes among the possible mode settings 234 are designated as visible mode 1004' and invisible mode 1002', respectively, between which the user can toggle via an on-screen button 1012 or the like in the UI screen of the phone application 254, and which are treated in the same manner described above for the on-shift and off-shift modes, at least in terms of the use of these two different mode configurations to dictate which data types are communicated to the controller 110 (per FIG. 11), or made visible to the monitoring operators via their status monitoring devices 106 (per FIG. 11A). Non-limiting examples of ways in which the implementation of visible and invisible mode configurations may differ from the preceding on-shift and off-shift modes may include: lack of automated switching of the mode setting 234 based on user shift schedules, and optional implementation of consistent forwarding of family member related alerts to an employee, regardless of whether the employee's mode setting is visible or invisible at the time of a detected potential emergency event regarding a family member of the employee.

The on-shift/off-shift mode option for lone workers subjected to mandatory monitoring, and the visible/invisible mode option for employees falling outside such monitoring mandates, are just two non-limiting examples of embodiments in which different first (e.g. on-shift, or visible) and second (e.g. off-shift, or invisible) mode configurations 1004/1004', 1002/1002' storing different configuration settings regarding the type of data to be communicated to the controller, or made visible to the monitoring operators, may be put to beneficial use for optimal balance between the safety and privacy of the monitored users.

The flowcharts and above-described functionality may be implemented by software executed by one or more processors operating pursuant to instructions stored on a tangible computer-readable medium such as a storage device to perform the above-described functions of any or all aspects of the controller 110, the user monitoring devices 104, and/or the configuration and status monitoring devices 106. Examples of the tangible computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network 108 such as the Internet. The processors may be included in a general-purpose or specific-purpose computer that becomes the controller 110, the user monitoring devices 104, and/or the configuration and status monitoring devices 106 or any of the above-described devices as a result of executing the instructions.

In other embodiments, rather than being software modules executed by one or more processors, the flowcharts and above-described functionality may be implemented as hardware modules configured to perform the above-described functions. Examples of hardware modules include combinations of logic gates, integrated circuits, field programmable gate arrays, and application specific integrated circuits, and other analog and digital circuit designs.

Functions of single units may be separated into multiple units, or the functions of multiple units may be combined into a single unit. For example, rather than providing the webserver 216 as a software program executed by the controller 110, the webserver 216 may a separate computer server than the controller 110.

Unless otherwise specified, features described may be implemented in hardware or software according to different design requirements. In addition to a dedicated physical computing device, the word "server" may also mean a service daemon on a single computer, virtual computer, or shared physical computer or computers, for example. All combinations and permutations of the above described features and embodiments may be utilized in conjunction with the invention.

What is claimed is:

1. A system for remote user monitoring, the system comprising:
    a user monitoring device having one or more sensors and being associated with a user; and
    a controller at least intermittently coupled to the user monitoring device by one or more networks;
    wherein the controller includes one or more storage devices and one or more processors, and, by executing software loaded from the one or more storage devices, the one or more processors are configured to:
        receive a plurality of sensor data from the user monitoring device;
        update a plurality of user data associated with the user in the one or more storage devices according to the sensor data;
        detect a potential emergency associated with the user at least according to the sensor data and send an alert to a monitoring operator terminal for notifying a monitoring operator of the potential emergency associated with the user;
        in response to receiving a message from the monitoring operator terminal confirming the user is experiencing an emergency event, generate an emergency event code and store in the one or more storage devices i) an association of the emergency event code with the user and ii) an indication that the emergency event code is active;
        send the emergency event code to the monitoring operator terminal;
        receive a user data access request from an emergency dispatcher terminal operated by an emergency dispatcher, the user data access request including the emergency event code;
        look up in the one or more storage devices whether the emergency event code received from the emergency dispatcher terminal is active;
        reply to the user data access request by sending one or more parts of the user data associated with the user to the emergency dispatcher terminal when determining that the emergency event code received from the emergency dispatcher terminal is active; and
        reply to the user data access request by sending an access denied message to the emergency dispatcher terminal when determining that the emergency event code received from the emergency dispatcher terminal is not active.

2. The system of claim 1, wherein, in response to receiving the message from the monitoring operator terminal confirming the user is experiencing the emergency event, the one or more processors of the controller are configured to:
    determine an appropriate emergency dispatch location according to a last known position of the user experience the emergency event; and
    send one or more contact information of the appropriate emergency dispatch location to the monitoring operator terminal.

3. The system of claim 2, wherein:
    the plurality of sensor data received from the user monitoring device includes current position data of the user as measured by a global positioning system (GPS) sensor on the user monitoring device; and
    the one or more processors of the controller are configured to:
        save a plurality of timestamped position data of the user in the storage device; and
        determine the last known position of the user according to the timestamped position data for the user as stored in the user data.

4. The system of claim 2, wherein the one or more processors are further configured to determine the appropriate emergency dispatch location by searching a plurality of emergency dispatch data stored in the one or more storage devices to find the appropriate emergency dispatch location that covers a geographical area in which the emergency event is taking place.

5. The system of claim 2, wherein the one or more processors are further configured to determine the appropriate emergency dispatch location by sending the last known position of the user to an emergency dispatch clearing house and receive the contact information of the appropriate emergency dispatch location from the emergency dispatch clearing house.

6. The system of claim 5, wherein the one or more processors are further configured to send the emergency event code to the emergency event clearing house, and the emergency event clearing house automatically passes the emergency event code to the appropriate emergency dispatch location.

7. The system of claim 1, further comprising a configuration device associated with the user and communicable with the user monitoring device, wherein:
    the configuration device includes one or more storage devices and one or more processors, and, by executing software loaded from the one or more storage devices of the configuration device, the one or more processors of the configuration device are configured to display in a user interface a list of sensor data types that are made visible to the monitoring operator during a first mode, and from which the user can make a custom selection of sensor data types to make visible to, or hidden from, the monitoring operator during a second mode; and
    the one or more processors of the controller are configured to, in response to dynamic change of a mode setting from said first mode to said second mode, change which of said sensor data types are made visible to the monitoring operator based on said custom selection of sensor data types.

8. The system of claim 7, wherein the one or more processors of the controller are further configured to:

after confirmation of the emergency event, dynamically change the mode setting to an emergency mode that overrides the second mode and the custom selection of sensor data types.

9. The system of claim 7, wherein the one or more processors of the configuration device are further configured to:
   display in said user interface a first send interval specifying a first time interval for repeatedly sending the sensor data to the controller during the first mode; and
   also display in said user interface a second send interval specifying a second time interval for repeatedly sending the sensor data to the controller during the second mode;
   wherein the second send interval is configurable by the user to be different than a first send interval.

10. The system of claim 1, wherein:
    the user monitoring device further includes one or more communication interfaces, one or more storage devices and one or more processors, and, by executing software loaded from the one or more storage devices of the user monitoring device, the one or more processors of the user monitoring device are configured to send the sensor data to the controller by communicating with a mobile phone connected to the user monitoring device via the one or more communication interfaces of the user monitoring device.

11. The system of claim 1, wherein:
    the user monitoring device further includes one or more communication interfaces, one or more storage devices and one or more processors, and, by executing software loaded from the one or more storage devices of the user monitoring device, the one or more processors of the user monitoring device are further configured to send the sensor data to the controller by communicating with the controller via the one or more communication interfaces of the user monitoring device.

12. The system of claim 1, wherein:
    the user is a lone worker of a company and is working at a remote location;
    the monitoring operator is at a monitoring operator platform run by the company for monitoring lone workers; and
    the emergency dispatcher is at a public-safety answering point (PSAP).

13. The system of claim 1, wherein:
    the user is a first member of a family;
    the monitoring operator is a second member of the family; and
    the emergency dispatcher is at a public-safety answering point (PSAP).

14. The system of claim 1, wherein, when determining that the emergency event code received from the emergency dispatcher terminal is active, the one or more processors of the controller are further configured to pass, substantially in real time, notes and updates between the emergency dispatcher terminal and the monitoring operator terminal about the emergency event.

15. A method of remote user monitoring, the method comprising:
    receiving by a controller a plurality of sensor data from a user monitoring device, the user monitoring device having one or more sensors and being associated with a user, and the controller being a computer at least intermittently coupled to the user monitoring device by one or more networks;
    updating by the controller a plurality of user data associated with the user in one or more storage devices according to the sensor data;
    detecting by the controller a potential emergency associated with the user at least according to the sensor data and sending an alert to a monitoring operator terminal for notifying a monitoring operator of the potential emergency associated with the user;
    in response to receiving a message from the monitoring operator terminal confirming the user is experiencing an emergency event, generating by the controller an emergency event code and storing in the one or more storage devices i) an association of the emergency event code with the user and ii) an indication that the emergency event code is active;
    sending by the controller the emergency event code to the monitoring operator terminal;
    receiving by the controller a user data access request from an emergency dispatcher terminal operated by an emergency dispatcher, the user data access request including the emergency event code;
    looking up by the controller in the one or more storage devices whether the emergency event code received from the emergency dispatcher terminal is active;
    replying to the user data access request by the controller sending one or more parts of the user data associated with the user to the emergency dispatcher terminal when determining that the emergency event code received from the emergency dispatcher terminal is active; and
    replying to the user data access request by the controller sending an access denied message to the emergency dispatcher terminal when determining that the emergency event code received from the emergency dispatcher terminal is not active.

16. The method of claim 15, wherein, in response to receiving the message from the monitoring operator terminal confirming the user is experiencing the emergency event, the method further comprises:
    determining by the controller an appropriate emergency dispatch location according to a last known position of the user experience the emergency event; and
    sending one or more contact information of the appropriate emergency dispatch location from the controller to the monitoring operator terminal.

17. The method of claim 16, wherein:
    the plurality of sensor data received from the user monitoring device includes current position data of the user as measured by a global positioning system (GPS) sensor on the user monitoring device; and
    the method further comprises:
    saving by the controller a plurality of timestamped position data of the user in the storage device; and
    determining by the controller the last known position of the user according to the timestamped position data for the user as stored in the user data.

18. The method of claim 16, further comprising determining by the controller the appropriate emergency dispatch location by searching a plurality of emergency dispatch data stored in the one or more storage devices to find the appropriate emergency dispatch location that covers a geographical area in which the emergency event is taking place.

19. The method of claim 16, wherein, when determining that the emergency event code received from the emergency dispatcher terminal is active, the method further comprises passing, substantially in real time, notes and updates between the emergency dispatcher terminal and the monitoring operator terminal about the emergency event.

20. A non-transitory processor-readable medium comprising processor executable instructions that when executed by one or more processors cause the one or more processors to perform steps of:

receiving a plurality of sensor data from a user monitoring device, the user monitoring device having one or more sensors and being associated with a user, and being at least intermittently coupled to the one or more processors by one or more networks;

updating a plurality of user data associated with the user in one or more storage devices according to the sensor data;

detecting a potential emergency associated with the user at least according to the sensor data and sending an alert to a monitoring operator terminal for notifying a monitoring operator of the potential emergency associated with the user;

in response to receiving a message from the monitoring operator terminal confirming the user is experiencing an emergency event, generating an emergency event code and storing in the one or more storage devices i) an association of the emergency event code with the user and ii) an indication that the emergency event code is active;

sending the emergency event code to the monitoring operator terminal;

receiving a user data access request from an emergency dispatcher terminal operated by an emergency dispatcher, the user data access request including the emergency event code;

looking up in the one or more storage devices whether the emergency event code received from the emergency dispatcher terminal is active;

replying to the user data access request by sending one or more parts of the user data associated with the user to the emergency dispatcher terminal when determining that the emergency event code received from the emergency dispatcher terminal is active; and replying to the user data access request by sending an access denied message to the emergency dispatcher terminal when determining that the emergency event code received from the emergency dispatcher terminal is not active.

* * * * *